US012744161B2

(12) United States Patent
Jogan

(10) Patent No.: US 12,744,161 B2
(45) Date of Patent: Sep. 22, 2026

(54) FILM CAPACITOR HAVING A TERMINAL ELECTRODE INCLUDING A SUBSTRATE CONNECTOR, AND METHOD FOR PRODUCING FILM CAPACITOR

(71) Applicant: Murata Manufacturing Co., Ltd., Nagaokakyo (JP)

(72) Inventor: Satoru Jogan, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 104 days.

(21) Appl. No.: 18/677,315

(22) Filed: May 29, 2024

(65) Prior Publication Data

US 2024/0312724 A1 Sep. 19, 2024

Related U.S. Application Data

(63) Continuation of application No. PCT/JP2022/038446, filed on Oct. 14, 2022.

(30) Foreign Application Priority Data

Dec. 1, 2021 (JP) ................................ 2021-195396

(51) Int. Cl.
*H01G 4/224* (2006.01)
*H01G 2/06* (2006.01)
(Continued)

(52) U.S. Cl.
CPC ............... *H01G 4/224* (2013.01); *H01G 2/06* (2013.01); *H01G 4/228* (2013.01); *H01G 4/32* (2013.01);
(Continued)

(58) Field of Classification Search
None
See application file for complete search history.

(56) References Cited

U.S. PATENT DOCUMENTS 3,806,766 A * 4/1974 Fanning .................. H01G 4/32 174/532
11,682,520 B2 6/2023 Nakamura et al.
(Continued)

FOREIGN PATENT DOCUMENTS

JP H02-155215 A 6/1990
JP H02-240907 A 9/1990
(Continued)

OTHER PUBLICATIONS

Translation JP 2006269872A (Year: 2006).*
(Continued)

*Primary Examiner* — Eric W Thomas
(74) *Attorney, Agent, or Firm* — ArentFox Schiff LLP

(57) ABSTRACT

A film capacitor including: a laminate of a dielectric film; a first electrode; a second electrode; a terminal electrode including a connector electrically connected to the first electrode or the second electrode, and an extension extending in a substrate mounting direction along the first electrode or the second electrode from the connector; and an exterior material covering the laminate, the first electrode, the second electrode, the connector, and at least a part of the extension. The film capacitor has a columnar shape having a side surface, the side surface has a curved part, and at least a part of the extension is arranged at a position shifted from a position closest to the substrate in the curved part in a space between a region facing the substrate of the curved part and the substrate when the film capacitor is mounted on the substrate.

14 Claims, 29 Drawing Sheets

(51) Int. Cl.

| | |
|---|---|
| ***H01G 4/228*** | (2006.01) |
| ***H01G 4/32*** | (2006.01) |
| *H01G 4/33* | (2006.01) |
| *H01G 13/00* | (2013.01) |
| *H01G 13/04* | (2006.01) |

(52) U.S. Cl.

CPC ............. *H01G 4/33* (2013.01); *H01G 13/003* (2013.01); *H01G 13/04* (2013.01)

(56) References Cited

U.S. PATENT DOCUMENTS

| | | | | |
|---|---|---|---|---|
| 2006/0104006 | A1* | 5/2006 | Saito ...................... | H01G 4/224 361/301.3 |
| 2020/0350121 | A1 | 11/2020 | Nakamura et al. | |

FOREIGN PATENT DOCUMENTS

| | | | | |
|---|---|---|---|---|
| JP | 04343407 | A | * | 11/1992 |
| JP | H0645178 | A | | 2/1994 |
| JP | 3025930 | U | * | 6/1996 |
| JP | H08-316110 | A | | 11/1996 |
| JP | 2973708 | B2 | | 11/1999 |
| JP | 2006269872 | A | * | 10/2006 |
| WO | 2019/087260 | A1 | | 5/2019 |

OTHER PUBLICATIONS

Translation JP 3025930 U (Year: 1996).*

International Search Report received for PCT Patent Application No. PCT/JP2022/038446, mailed on Jan. 10, 2023, 2 pages (English Translation Only).

* cited by examiner

FILM CAPACITOR HAVING A TERMINAL ELECTRODE INCLUDING A SUBSTRATE CONNECTOR, AND METHOD FOR PRODUCING FILM CAPACITOR

CROSS REFERENCE TO RELATED APPLICATIONS

The present application is a continuation of International application No. PCT/JP2022/038446, filed Oct. 14, 2022, which claims priority to Japanese Patent Application No. 2021-195396, filed Dec. 1, 2021, the entire contents of each of which are incorporated herein by reference.

TECHNICAL FIELD

The present disclosure relates to a film capacitor and a method for producing a film capacitor.

BACKGROUND ART

A film capacitor in which a laminate of dielectric films is sealed with resin is known.

For example, JP-A-08-316110 (Patent Document 1) describes a film capacitor coated with resin and externally sealed.

SUMMARY OF THE DISCLOSURE

The film capacitor described in Patent Document 1 has room for improvement in terms of size reduction and height reduction.

The present disclosure provides a film capacitor that achieves size reduction and height reduction and a method for producing a film capacitor.

A film capacitor according to one aspect of the present disclosure includes: a laminate of a dielectric film; a first electrode on a first end surface of the laminate; a second electrode on a second end surface of the laminate; a terminal electrode including a connector electrically connected to the first electrode or the second electrode, and an extension extending in a substrate mounting direction along the first electrode or the second electrode from the connector; and an exterior material covering the laminate, the first electrode, the second electrode, the connector, and at least a part of the extension, wherein the film capacitor has a columnar shape having a side surface connecting the first electrode and the second electrode, the side surface has a curved part, and at least a part of the extension is arranged at a first position shifted from a second position closest to the substrate in the curved part in a space provided between a region facing the substrate of the curved part and the substrate when the film capacitor is mounted on the substrate.

A method for producing a film capacitor according to an aspect of the present disclosure includes: forming a laminate of a dielectric film; forming a first electrode at a first end of the laminate; forming a second electrode at a second end of the laminate; connecting a terminal electrode having a connector with at least one of the first electrode or the second electrode, and having an extension extending from the connector in a substrate mounting direction along the first electrode or the second electrode from the connector; immersing the laminate to which the terminal electrode is connected in a liquid exterior material by inclining the extension of the terminal electrode from a direction perpendicular to a liquid surface of the exterior material; and curing the exterior material.

According to the present disclosure, it is possible to provide a film capacitor that achieves size reduction and height reduction and a method for producing a film capacitor.

Figure 1:
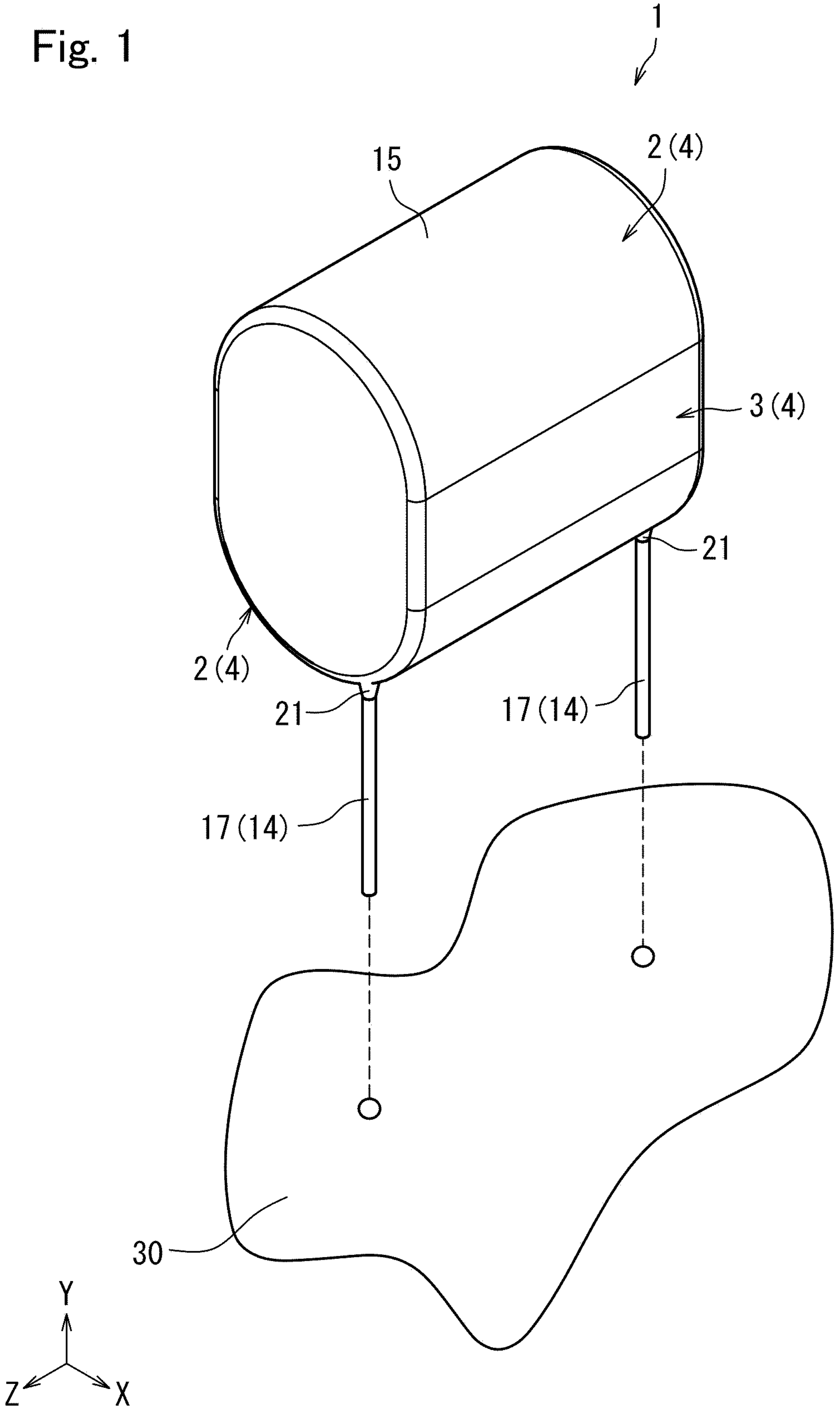
FIG. 1 is a perspective view illustrating a film capacitor according to a first embodiment.

DETAILED DESCRIPTION OF THE PREFERRED EMBODIMENTS (Circumstances Leading to Present Disclosure)

A wound film capacitor formed by winding a dielectric film generally has a rounded side surface. For this reason, when a wound film capacitor is mounted on a substrate, a rounded portion becomes a dead space, which hinders size reduction of a device.

Furthermore, in a case of exterior sealing by coating with resin as in the film capacitor described in Patent Document 1, there is a problem that extra resin adheres to a terminal and a dead space is further increased when the film capacitor is mounted on a substrate.

In view of the above, the present inventor(s) have studied a film capacitor in which a terminal electrode is arranged in a portion that becomes a dead space when the film capacitor is mounted on a substrate, and have reached the disclosure below.

A film capacitor according to a first aspect of the present disclosure is a film capacitor mounted on a substrate, the film capacitor including: a laminate of a dielectric film; a first electrode on a first end surface of the laminate; a second electrode on a second end surface of the laminate; a terminal electrode including a connector electrically connected to the first electrode or the second electrode, and an extension extending in a substrate mounting direction along the first electrode or the second electrode from the connector; and an exterior material covering the laminate, the first electrode, the second electrode, the connector, and at least a part of the extension, wherein the film capacitor has a columnar shape having a side surface connecting the first electrode and the second electrode, the side surface has a curved part, and at least the part of the extension is arranged at a first position shifted from a second position closest to the substrate in the curved part in a space between a region facing the substrate of the curved part and the substrate when the film capacitor is mounted on the substrate.

With such a configuration, since a distance between a film capacitor when mounted on a substrate and the substrate can be reduced, size reduction and height reduction of a device can be achieved.

In the film capacitor according to a second aspect of the present disclosure, a portion of the exterior material covering at least a part of the extension may be arranged in the space.

With such a configuration, an extra exterior material attached to the terminal electrode can be arranged in a portion that becomes a dead space. For this reason, a distance between the film capacitor when mounted and the substrate can be reduced. Further, since a mounting area of the substrate can be reduced, degree of freedom in design can be improved.

In the film capacitor according to a third aspect of the present disclosure, a portion of the exterior material covering at least a part of the extension may be arranged at a position farther from the substrate than a position closest to the substrate in the curved part.

With such a configuration, further size reduction and height reduction can be realized.

In the film capacitor according to a fourth aspect of the present disclosure, the extension may include a first extension extending along the curved part from the connector and a second extension extending toward the substrate from the first extension.

With such a configuration, an interval between the terminal electrodes can be changed without increasing a mounting area.

In the film capacitor according to a fifth aspect of the present disclosure, the terminal electrode may further include a substrate connector extending in a direction along the substrate from the extension, and the substrate connector may be arranged in the space.

With such a configuration, it is possible to provide the film capacitor suitable for surface mounting while reducing a mounting area.

In the film capacitor according to a sixth aspect of the present disclosure, a part of the side surface of the film capacitor may be in contact with the substrate.

With such a configuration, a contact area between the substrate and the film capacitor can be increased, so that stability when the film capacitor is mounted on the substrate can be improved.

In the film capacitor according to a seventh aspect of the present disclosure, a diameter of the curved part may be 8 mm or more.

With such a configuration, a space provided between the substrate and the film capacitor can be made large, so that an effect of height reduction can be easily obtained while a mounting area is reduced.

A method for producing a film capacitor according to an eighth aspect of the present disclosure includes: forming a laminate of a dielectric film; forming a first electrode at a first end of the laminate; forming a second electrode at a second end of the laminate; connecting a terminal electrode having a connector with at least one of the first electrode or the second electrode, and having an extension extending from the connector in a substrate mounting direction along the first electrode or the second electrode from the connector; immersing the laminate to which the terminal electrode is connected in a liquid exterior material by inclining the extension of the terminal electrode from a direction perpendicular to a liquid surface of the exterior material; and curing the exterior material.

With such a configuration, it is possible to produce a film capacitor that achieves size reduction and height reduction.

Hereinafter, an embodiment of the present disclosure will be described with reference to the accompanying drawings. Further, in each diagram, each element is exaggerated in order to facilitate description.

First Embodiment

Figure 2:
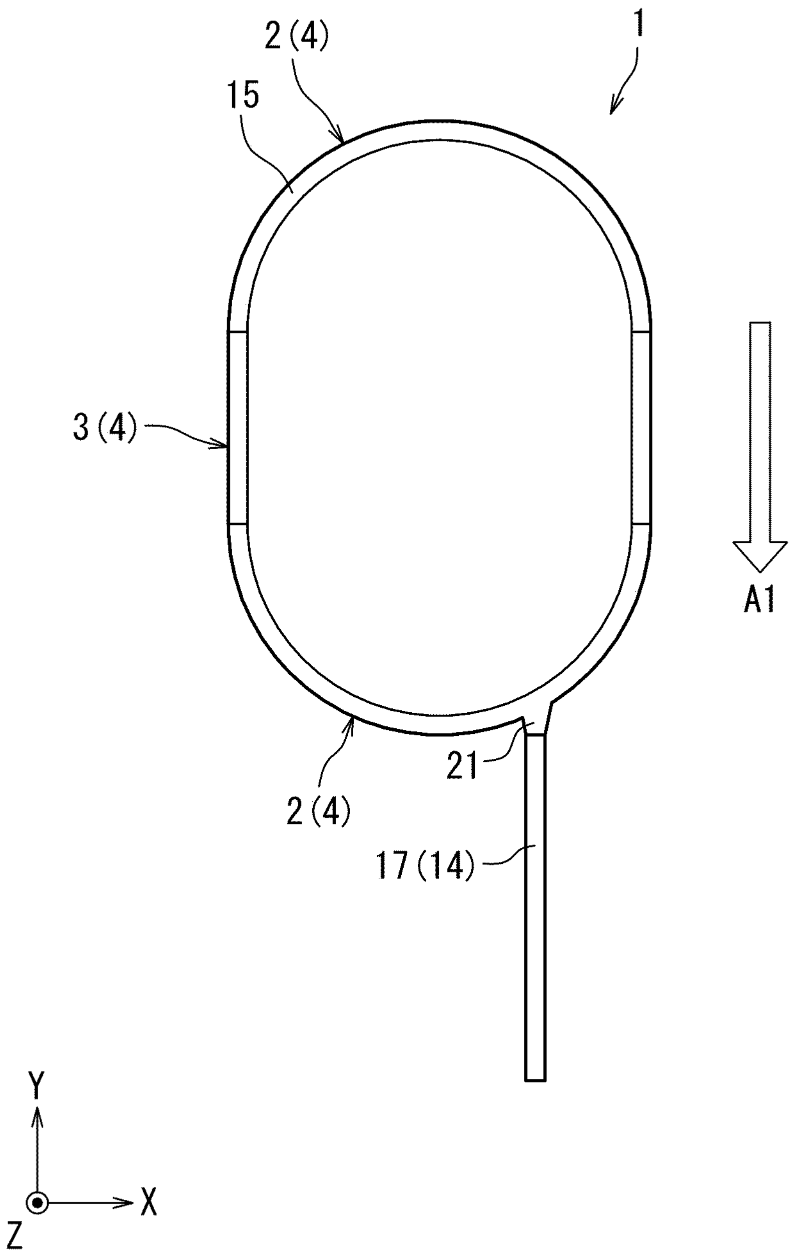
FIG. 2 is a front view of the film capacitor of FIG. 1.
Figure 3:
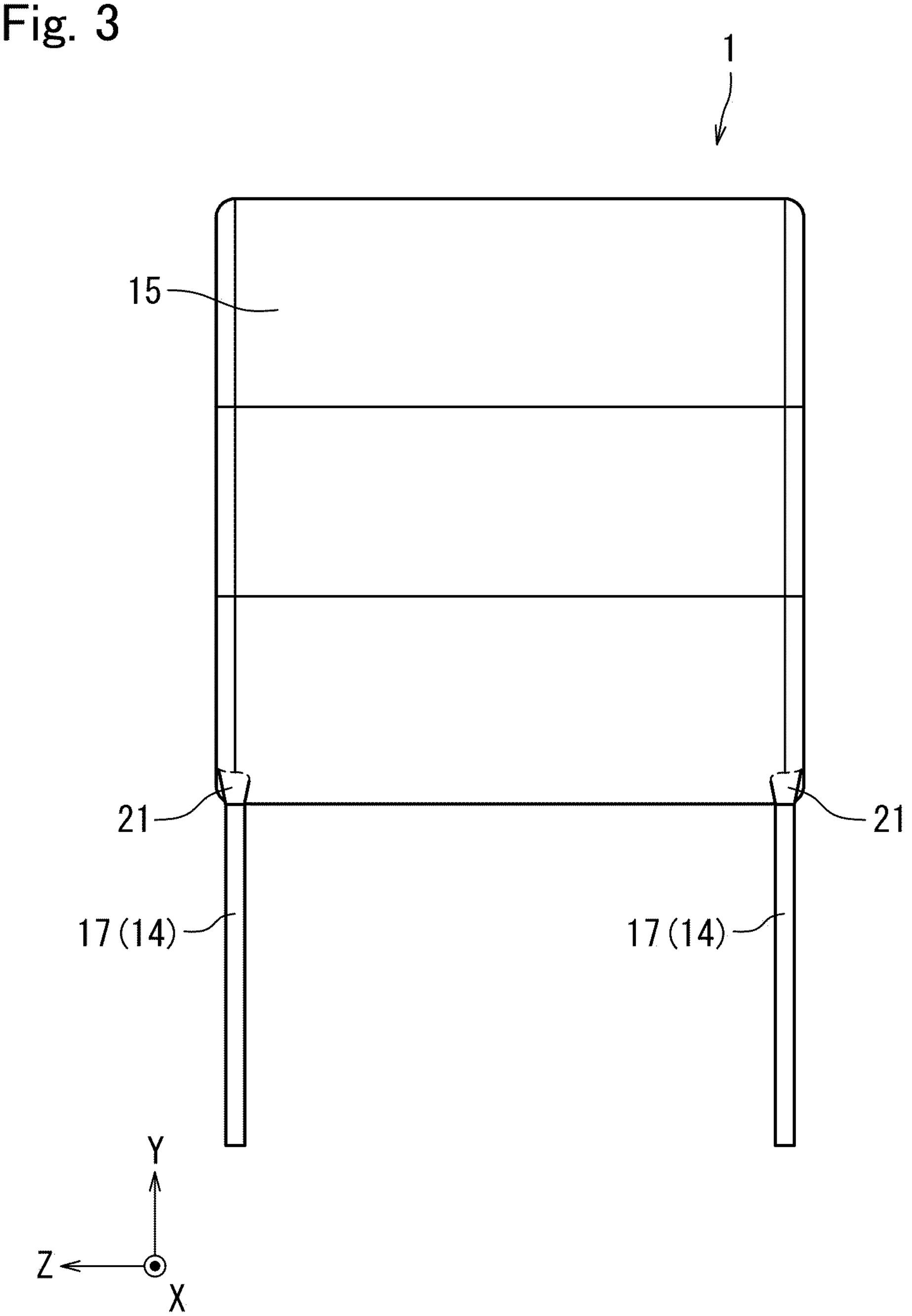
FIG. 3 is a side view of the film capacitor of FIG. 1.
Figure 4:
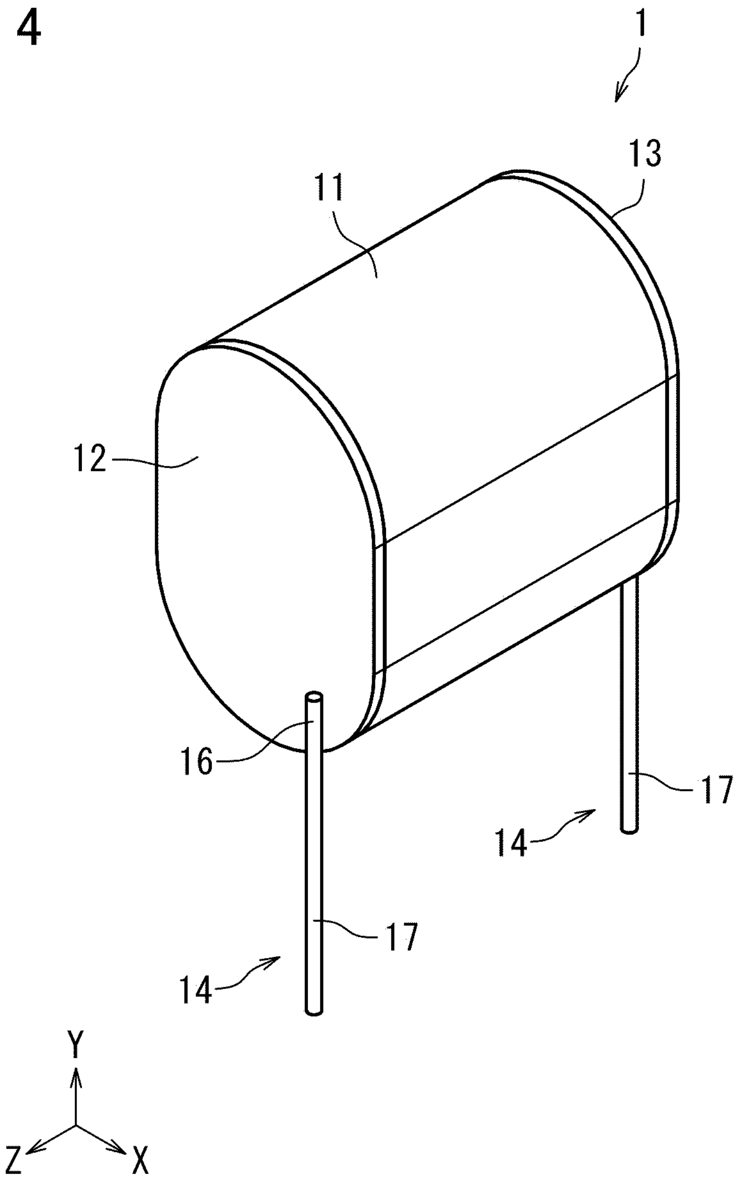
FIG. 4 is a diagram in which an exterior material of the film capacitor of FIG. 1 is omitted.
Figure 5:
FIG. 5 is a diagram in which an exterior material of the film capacitor of FIG. 2 is omitted.
Figure 6:
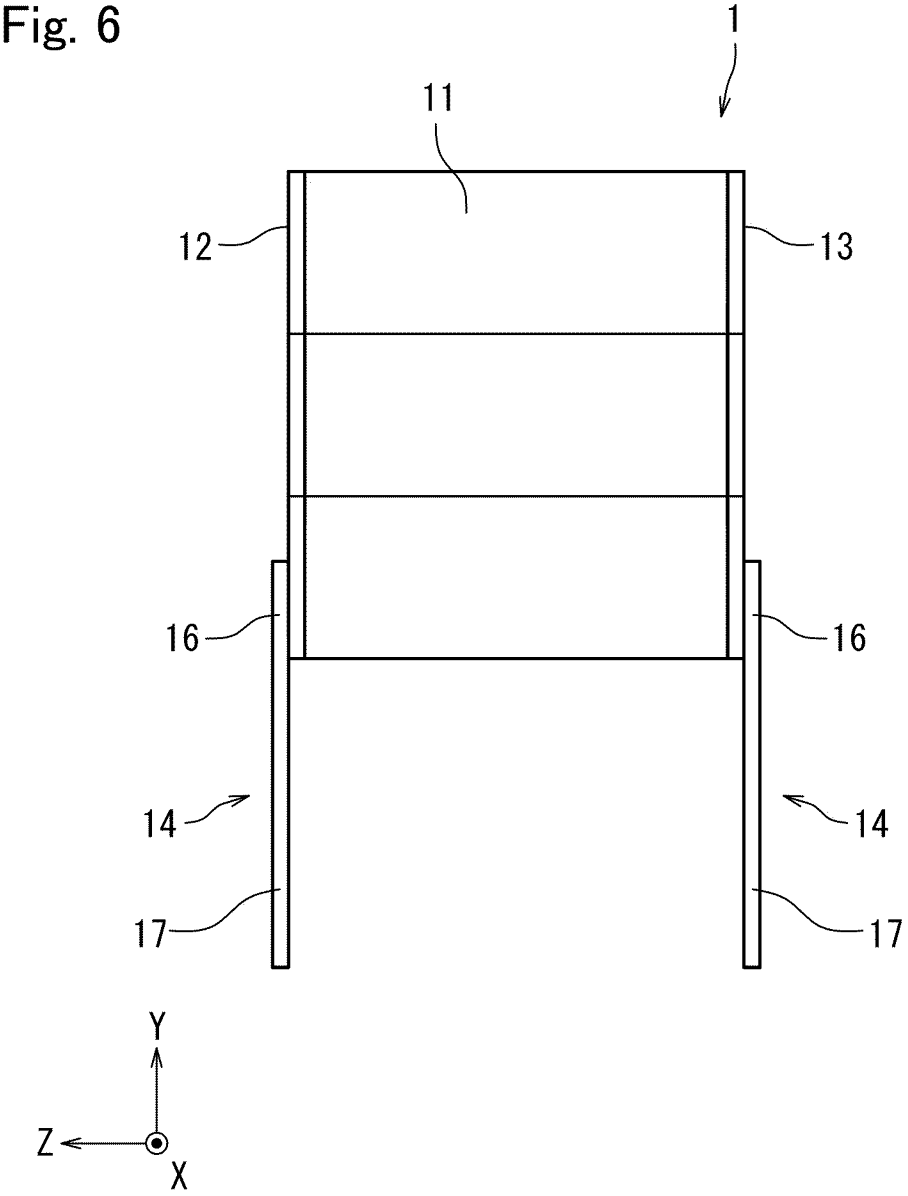
FIG. 6 is a diagram in which an exterior material of the film capacitor of FIG. 3 is omitted.

FIG. 1 is a perspective view illustrating a film capacitor 1 according to a first embodiment. FIG. 2 is a front view of the film capacitor 1 in FIG. 1. FIG. 3 is a side view of the film capacitor 1 in FIG. 1. FIG. 4 is a diagram in which an exterior material 15 of the film capacitor 1 in FIG. 1 is omitted. FIG. 5 is a diagram in which the exterior material 15 of the film capacitor 1 in FIG. 2 is omitted. FIG. 6 is a diagram in which the exterior material 15 of the film capacitor 1 in FIG. 3 is omitted. Note that X, Y, and Z directions in the diagrams respectively indicate a lateral direction, a height direction, and a longitudinal direction of the film capacitor 1.

[Overall Configuration]

As illustrated in FIGS. 1 to 3, the film capacitor 1 is a columnar film capacitor having an elliptical cross section. In other words, the film capacitor 1 has a side surface 4 including two curved parts 2 and a flat portion 3 connecting the curved parts 2, and is formed in a columnar shape. Note that, although a boundary between the curved part 2 and the flat portion 3 in FIGS. 1 to 6 is indicated by a solid line, the boundary is merely indicated by a solid line for convenience, and in an actual film capacitor, the curved part 2 and the flat portion 3 do not need to be separated by a boundary. The same applies to FIG. 7 and subsequent diagrams.

As illustrated in FIG. 4, the film capacitor 1 includes a laminate 11 of dielectric films, a first electrode 12, a second electrode 13, and a terminal electrode 14. Further, the laminate 11, the first electrode 12, the second electrode 13, and at least a part of the terminal electrode 14 are covered with the exterior material 15. The film capacitor 1 is mounted on a substrate 30 (see FIG. 7) by the terminal electrode 14.

The laminate 11 of the film capacitor 1 according to the present embodiment is formed by stacking dielectric films having a metal vapor deposition film formed on a surface, and then winding the dielectric films. Therefore, the laminate 11 may be referred to as a wound body. In the present embodiment, the laminate 11 is formed in a columnar shape having an elliptical cross section as a wound body of dielectric films is pressed into a flat shape. The laminate 11 can also be formed by laminating dielectric films without winding.

As the dielectric film, for example, a plastic film of polyethylene terephthalate, polypropylene, polyphenylene sulfide, polyethylene naphthalate, or the like can be used. As a metal vapor deposition film formed on a surface of a plastic film, for example, metal such as Al or Zn can be used. The first electrode 12 is formed in one end portion of the laminate 11 of the dielectric film, and the second electrode 13 is formed in another end portion. The first electrode 12 and the second electrode 13 can be formed by, for example, thermal spraying with Zn or the like on one end portion and another end portion of the laminate 11.

In the present embodiment, the terminal electrode 14 includes two of the terminal electrodes 14, the terminal electrode 14 electrically connected to the first electrode 12 and the terminal electrode 14 electrically connected to the second electrode 13. As illustrated in FIGS. 4 to 6, the terminal electrode 14 includes a connector 16 electrically connected to the first electrode 12 or the second electrode 13, and an extension 17 extending from the connector 16 in a substrate mounting direction along the first electrode 12 or the second electrode 13 (an arrow A1 in FIG. 2). The connector 16 is connected to the first electrode 12 or the second electrode 13 by being welded. The terminal electrode 14 is formed of, for example, a conductive material such as a lead wire.

The exterior material 15 is arranged so as to cover the laminate 11, the first electrode 12, the second electrode 13, the connector 16 of the terminal electrode 14, and at least a part of the extension 17 of the terminal electrode 14. As the exterior material 15, for example, synthetic resin such as epoxy resin can be used.

The exterior material 15 can be formed by immersing a film capacitor (see FIG. 4), in which the first electrode 12 and the second electrode 13 are formed on the laminate 11 and the terminal electrode 14 is connected to the first electrode 12 and the second electrode 13, in liquid resin by, for example, a dip coating method.

Figure 9A:
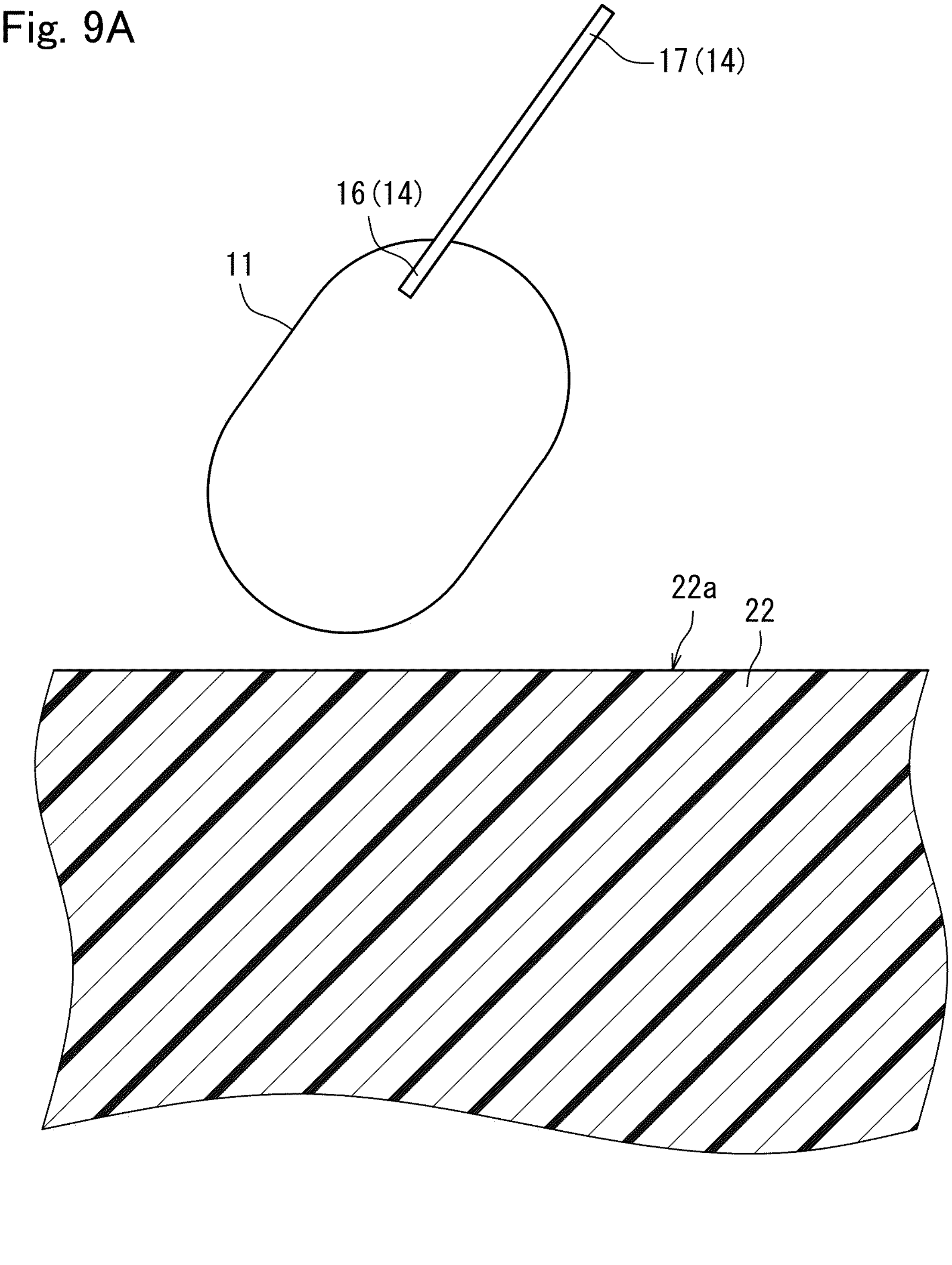
FIG. 9A is a diagram illustrating a state before a laminate is immersed in liquid resin.
Figure 9B:
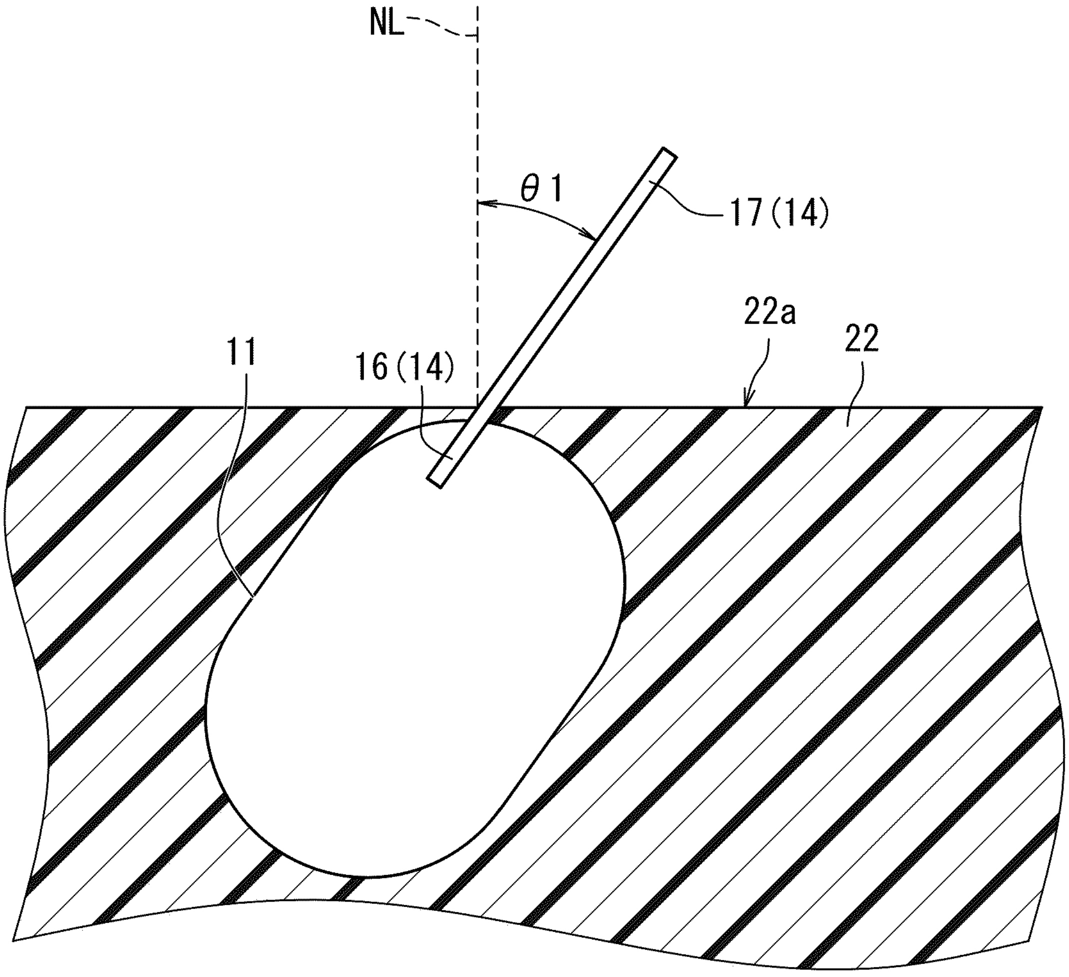
FIG. 9B is a diagram illustrating a state in which the laminate is immersed in the liquid resin.
Figure 9C:
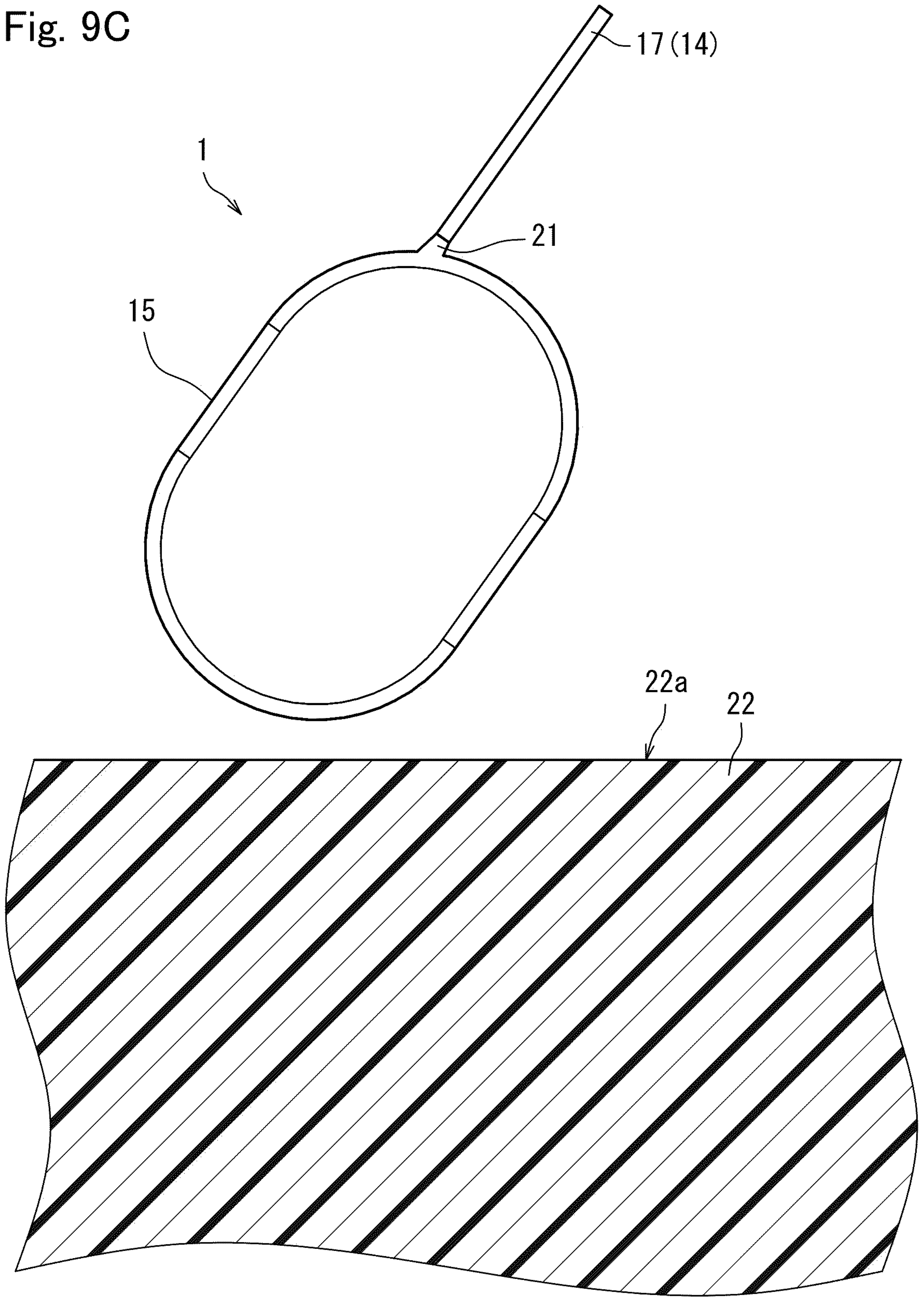
FIG. 9C is a diagram illustrating a state in which the laminate immersed in the liquid resin is pulled up.

When the film capacitor 1 is immersed in liquid resin, the laminate 11 including the first electrode 12 and the second electrode 13 is coated with the resin, and the resin adheres also to the connector 16 of the terminal electrode 14 and at least a part of the extension 17 of the terminal electrode 14. That is, as illustrated in FIGS. 9A to 9C described later, both the exterior material 15 and a resin film 21 at a base of the extension 17 are formed. In the present embodiment, the resin film 21 formed on the extension 17 is arranged in a portion that becomes a dead space when the film capacitor 1 is mounted on a substrate.

Figure 7:
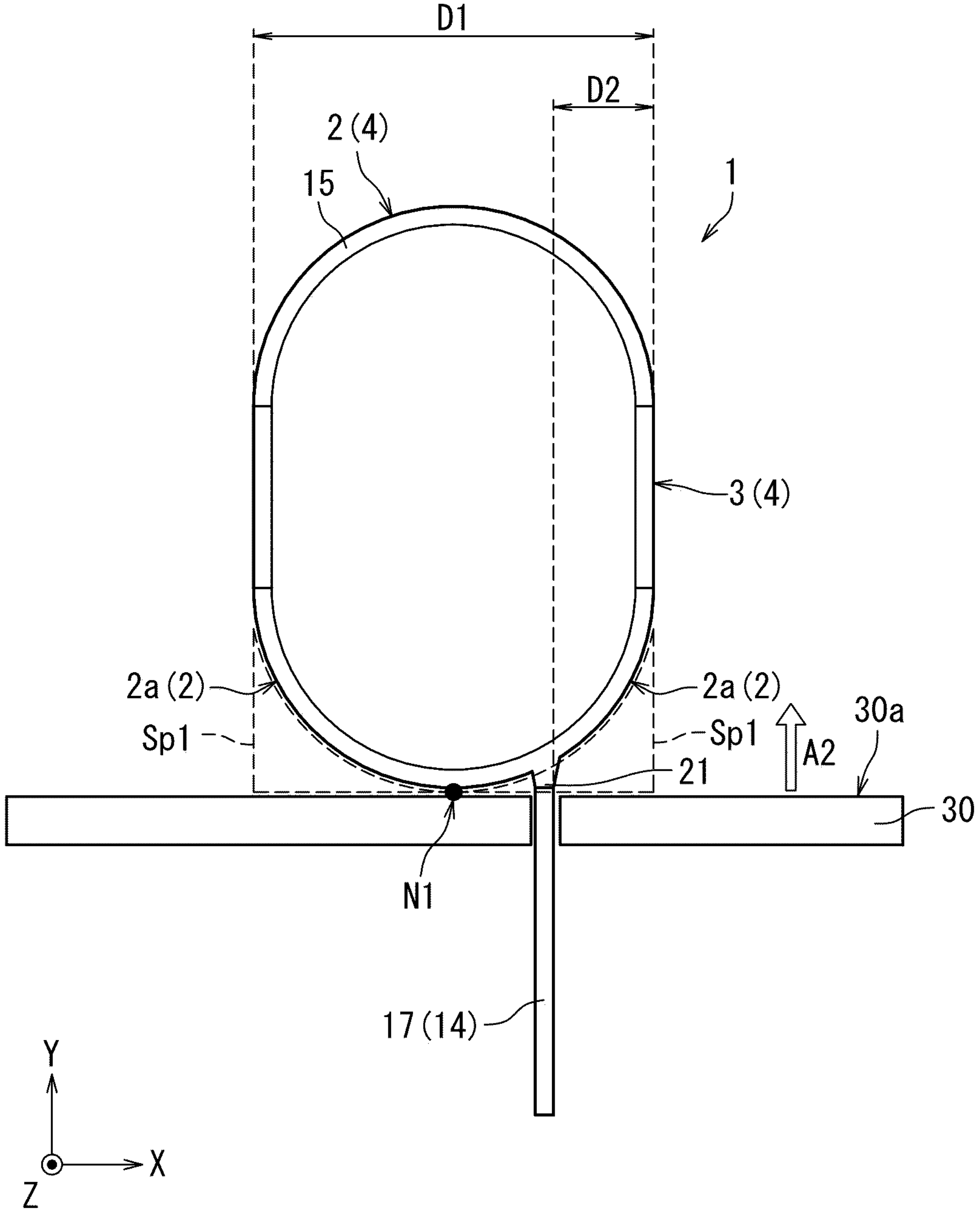
FIG. 7 is a front view when the film capacitor of FIG. 1 is mounted on a substrate.

FIG. 7 is a front view when the film capacitor 1 in FIG. 1 is mounted on the substrate 30. As illustrated in FIG. 7, in the present embodiment, the film capacitor 1 is mounted on the substrate 30 in a manner that one of the curved parts 2 of the side surface 4 faces a main surface 30*a* of the substrate 30. At this time, a space Sp1 is provided between a region 2*a* facing the substrate 30 of the curved part 2 and the substrate 30. Since another component cannot be mounted in the space Sp1, the space Sp1 becomes a dead space in the substrate 30. In the present embodiment, the terminal electrode 14 is formed such that at least a part of the extension 17 is arranged in the space Sp1 when the film capacitor 1 is mounted on the substrate 30. Furthermore, the extension 17 is drawn out to a position deviated from a position N1 closest to the substrate 30 of the curved part 2.

As the extension 17 is arranged in this way, the exterior material 15 can be formed in a manner that the resin film 21 is accommodated in the space Sp1 when the film capacitor 1 is mounted on the substrate 30. Since a portion where the resin film 21 is formed of the extension 17 cannot be inserted into a through hole of the substrate 30, it is possible to further reduce the dead space by forming the resin film 21 so as to be accommodated in the space Sp1. For this reason, the dead space can be reduced, which contributes to size reduction and height reduction of a device.

Further, the resin film 21 is arranged at a position farther from the substrate 30 (a position further away from the substrate 30 in a direction of an arrow A2) than the position N1 closest to the substrate 30 of the curved part 2. In other words, when the film capacitor 1 is mounted on the substrate 30, a distance between the position N1 and the substrate 30 is smaller than a distance between the resin film 21 and the substrate 30. With such arrangement of the resin film 21, the dead space can be further reduced.

In order to secure size of the space Sp1 provided when the film capacitor 1 is mounted on the substrate 30, a diameter D1 of the curved part 2 is preferably 8 mm or more. As the diameter D1 of the curved part 2 increases, the space Sp1 when the film capacitor 1 is mounted on the substrate 30 also increases. For this reason, the resin film 21 of the extension 17 can be easily accommodated in the space Sp1.

Further, a distance D2 from the extension 17 of the terminal electrode 14 to the flat portion 3 is preferably ¼ or less of the diameter D1 of the curved part 2. By arranging the extension 17 in this manner, it is possible to easily accommodate the resin film 21 in the space Sp1.

Further, as illustrated in FIG. 7, the substrate 30 and the position N1 of the film capacitor 1 may be in contact with each other. In this case, the number of contact portions between the film capacitor 1 and the substrate 30 can be increased, so that stability at the time of mounting can be improved.

[Producing Method]

Figure 8:
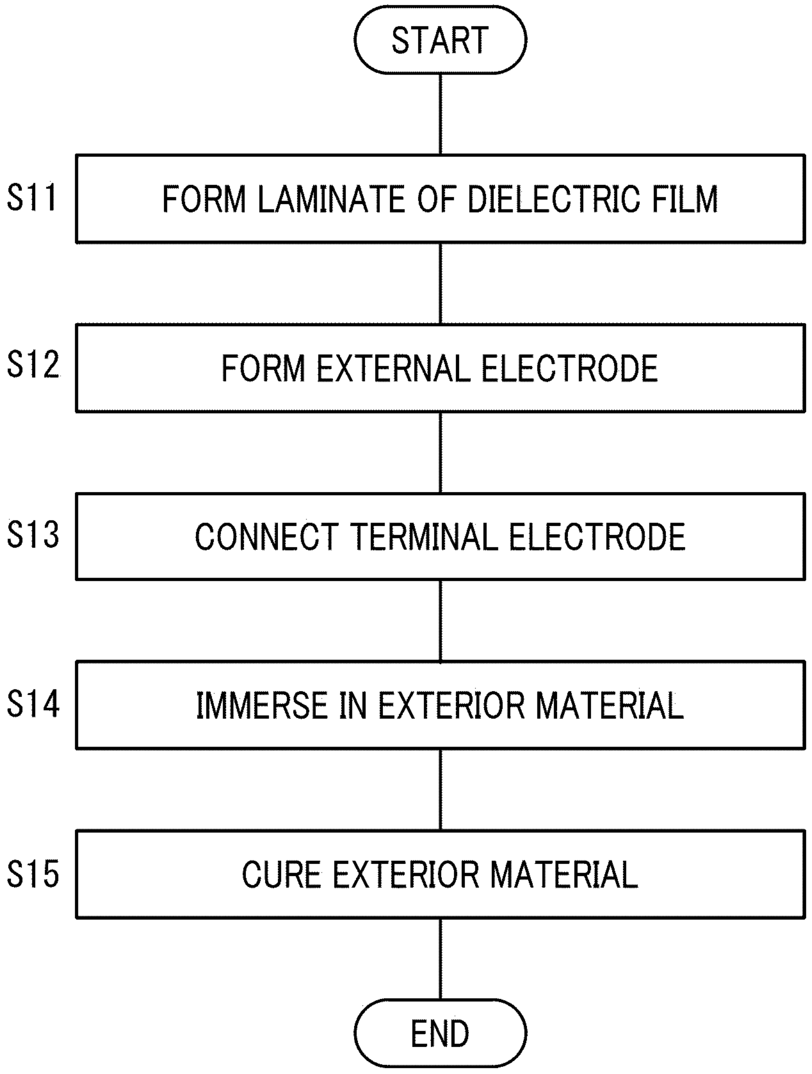
FIG. 8 is a flowchart illustrating a method for producing a film capacitor.

FIG. 8 is a flowchart illustrating a method for producing the film capacitor 1. The method for producing the film capacitor 1 will be described with reference to FIG. 8.

First, the laminate 11 of dielectric films is formed (Step S11). A dielectric film having a metal vapor deposition film formed on its surface is wound into a cylindrical shape, and then pressed with predetermined pressure, so that the laminate 11 having an elliptical cross section can be formed.

Next, the first electrode 12 and the second electrode 13 (external electrodes) are formed at both ends of the laminate 11 (Step S12). The first electrode 12 and the second electrode 13 can be formed, for example, by thermal spraying with metal such as Zn on both ends of the laminate 11.

Next, the terminal electrode 14 is connected to the first electrode 12 and the second electrode 13 (Step S13). The terminal electrode 14 is formed of, for example, a conductive material such as a lead wire, and can be connected to the first electrode 12 and the second electrode 13 by welding.

Next, the laminate 11 to which the terminal electrode 14 is connected is immersed in liquid resin 22 (Step S14). As the laminate 11 is immersed in liquid resin such as epoxy resin and pulled up, resin in a film shape can be attached to the laminate 11. FIG. 9A is a diagram illustrating a state before the laminate 11 is immersed in the liquid resin 22. FIG. 9B is a diagram illustrating a state in which the laminate 11 is immersed in a liquid exterior material. As illustrated in FIGS. 9A and 9B, when the laminate 11 is immersed in the liquid resin 22, the extension 17 is preferably inclined from a normal line NL perpendicular to a liquid surface 22*a* of the resin 22. At this time, the extension 17 is preferably inclined in a manner that an angle θ1 from a direction perpendicular to the liquid surface 22*a* is, for example, 20 degrees to 45 degrees. A value of the angle θ1 can be appropriately adjusted depending on a shape or size of the film capacitor. FIG. 9C is a diagram illustrating a state in which the laminate 11 immersed in the liquid resin 22 is pulled up. When the laminate 11 is pulled up from the liquid resin 22, as illustrated in FIG. 9C, the resin film 21 is formed at a base of the extension 17 of the terminal electrode 14 by surface tension.

Finally, the exterior material is cured (Step S15) to complete the film capacitor 1. As illustrated in FIG. 7, the completed film capacitor 1 is mounted on the substrate 30. As the extension 17 is immersed by being inclined from a direction perpendicular to the liquid surface 22*a*, as illustrated in FIG. 7, the resin film 21 is formed to be accommodated in the space Sp1 between the substrate 30 and the curved part 2.

[Effect]

The film capacitor 1 according to the first embodiment can achieve an effect below.

The film capacitor 1 includes the laminate 11, the first electrode 12, the second electrode 13, the terminal electrode 14, and the exterior material 15. The laminate 11 is formed by winding a dielectric film. The first electrode 12 is formed on one end surface of the laminate 11. The second electrode 13 is formed on another end surface of the laminate 11. The terminal electrode 14 includes the connector 16 and the extension 17. The connector 16 is electrically connected to the first electrode 12 or the second electrode 13. The extension 17 extends from the connector 16 toward the substrate 30 in a direction along the first electrode 12 or the second electrode 13. The exterior material 15 covers the first electrode 12, the second electrode 13, the connector 16, and at least a part of the extension 17. The film capacitor 1 is formed in a columnar shape having the side surface 4 connecting the first electrode 12 and the second electrode 13, and the side surface 4 has the curved part 2. When the film capacitor 1 is mounted on the substrate 30, at least a part of the extension 17 is arranged in the space Sp1 provided between a region facing the substrate 30 of the curved part 2 and the substrate 30, and at a position shifted from a position closest to the substrate 30 in the curved part 2.

With such a configuration, it is possible to provide a film capacitor that achieves size reduction and height reduction. Since a distance between a film capacitor when mounted on a substrate and the substrate can be reduced, size reduction and height reduction of a device can be achieved.

Further, a portion covering at least a part of the extension 17 of the exterior material 15 is arranged in the space Sp1.

With such a configuration, by arranging the extension 17 of the terminal electrode 14 so as to be accommodated in the space Sp1, the resin film 21 can be accommodated in a portion (the space Sp1) that becomes a dead space when the film capacitor 1 is mounted on the substrate 30. For this reason, it is possible to achieve reduction in a mounting area when the film capacitor 1 is mounted on the substrate 30 and height reduction.

Further, a portion covering at least a part of the extension 17 of the exterior material 15 is arranged at a position farther from the substrate 30 than a position closest to the substrate 30 in the curved part 2.

With such a configuration, the resin film 21 can be accommodated in a dead space when the film capacitor 1 is mounted on the substrate 30. This contributes to size reduction and height reduction of a device.

Further, a part of the side surface 4 of the film capacitor 1 is in contact with the substrate 30.

With such a configuration, a contact area between the film capacitor 1 and the substrate 30 can be increased, and stability at the time of mounting can be improved.

Further, a diameter of the curved part 2 is 8 mm or more.

With such a configuration, since a dead space when the film capacitor 1 is mounted on the substrate 30 becomes large, the resin film 21 can be easily stored in the dead space, and further size reduction and height reduction can be achieved.

A method for producing the film capacitor 1 includes a step of forming the laminate 11 of a dielectric film, a step of forming the external electrodes 12 and 13 at both ends of the laminate 11, a step of connecting the terminal electrode 14 having the connector 16 with an external electrode and the extension 17 extending from the connector 16 to the external electrodes 12 and 13, a step of immersing the laminate 11 to which the terminal electrode 14 is connected in the liquid resin 22, and a step of curing the resin 22. The step of immersing the laminate 11 to which the terminal electrode 14 is connected in the liquid resin 22 includes inclining the extension 17 of the terminal electrode 14 from a direction perpendicular to the liquid surface 22*a* of the resin 22.

With such a configuration, it is possible to produce a film capacitor that achieves size reduction and height reduction. By inclining the extension 17 with respect to the liquid surface 22*a* of the liquid resin 22, the resin film 21 can be accommodated in a portion that becomes a dead space when the film capacitor 1 is mounted on the substrate 30. For this reason, height reduction of a device can be achieved.

Note that, in the above-described embodiment, the film capacitor 1 of a columnar shape having an elliptical cross section is described as an example, but a shape of the film capacitor 1 is not limited to this. For example, a shape of the film capacitor 1 may be a shape having a curved part on a side surface, such as a cylindrical shape or an elliptical columnar shape.

Further, in the above-described embodiment, the example in which the exterior material 15 is formed by a dip coating method is described, but the present disclosure is not limited to this. The exterior material 15 can be formed by a method including a step of immersing in liquid.

Further, in the above-described embodiment, the example in which the terminal electrode 14 is formed of a lead wire is described, but the present disclosure is not limited to this. For example, the terminal electrode 14 may be formed of a flat terminal. Further, the terminal electrode 14 may be connected to the first electrode 12 or the second electrode 13 by solder bonding.

Second Embodiment

A film capacitor 1A according to a second embodiment of the present disclosure will be described.

In the second embodiment, a point different from the first embodiment will be mainly described. In the second embodiment, the same or equivalent configuration as that of the first embodiment will be described with the same reference numeral. Further, in the second embodiment, description overlapping that of the first embodiment is omitted.

Figure 10:
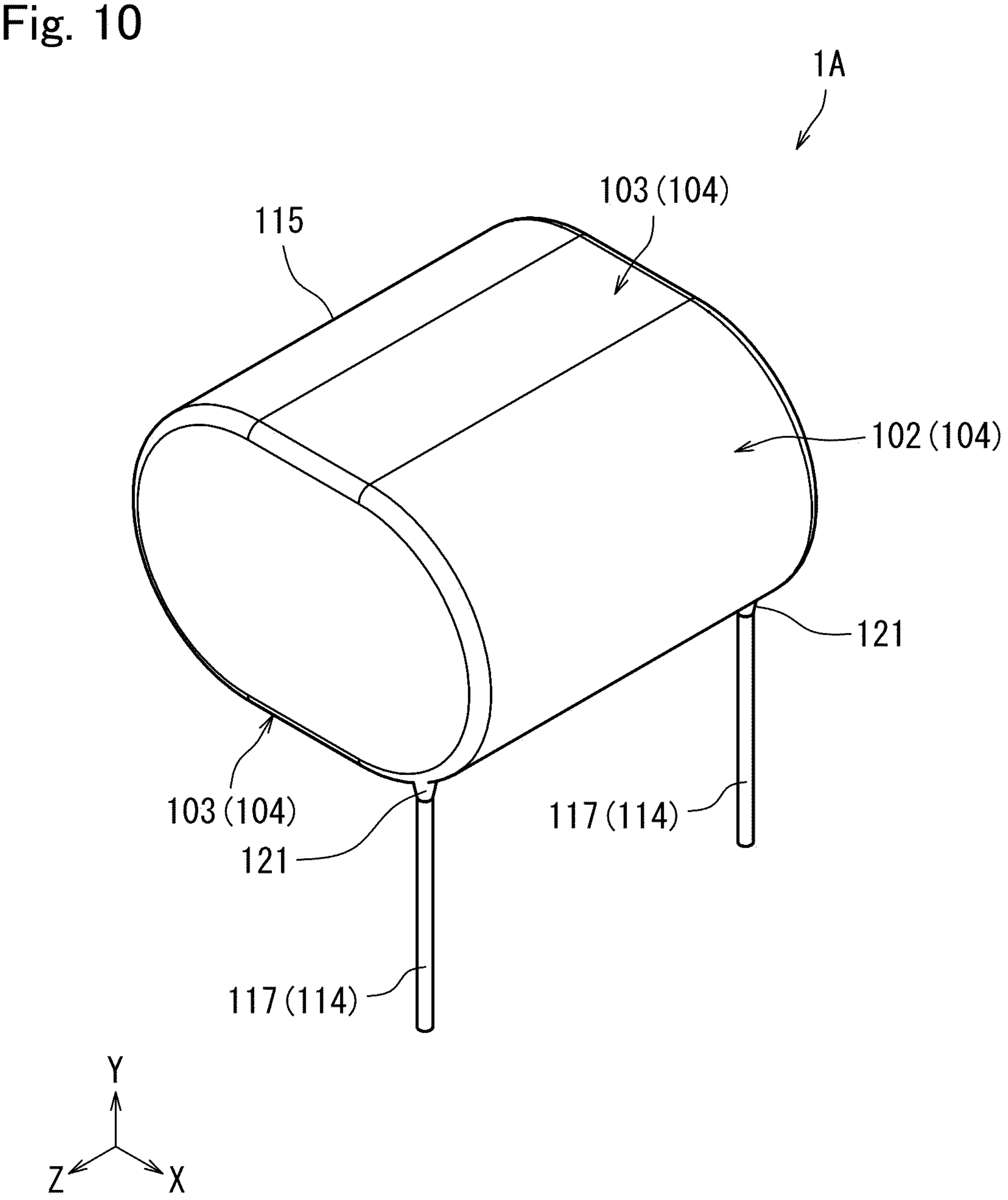
FIG. 10 is a perspective view illustrating the film capacitor according to a second embodiment.
Figure 11:
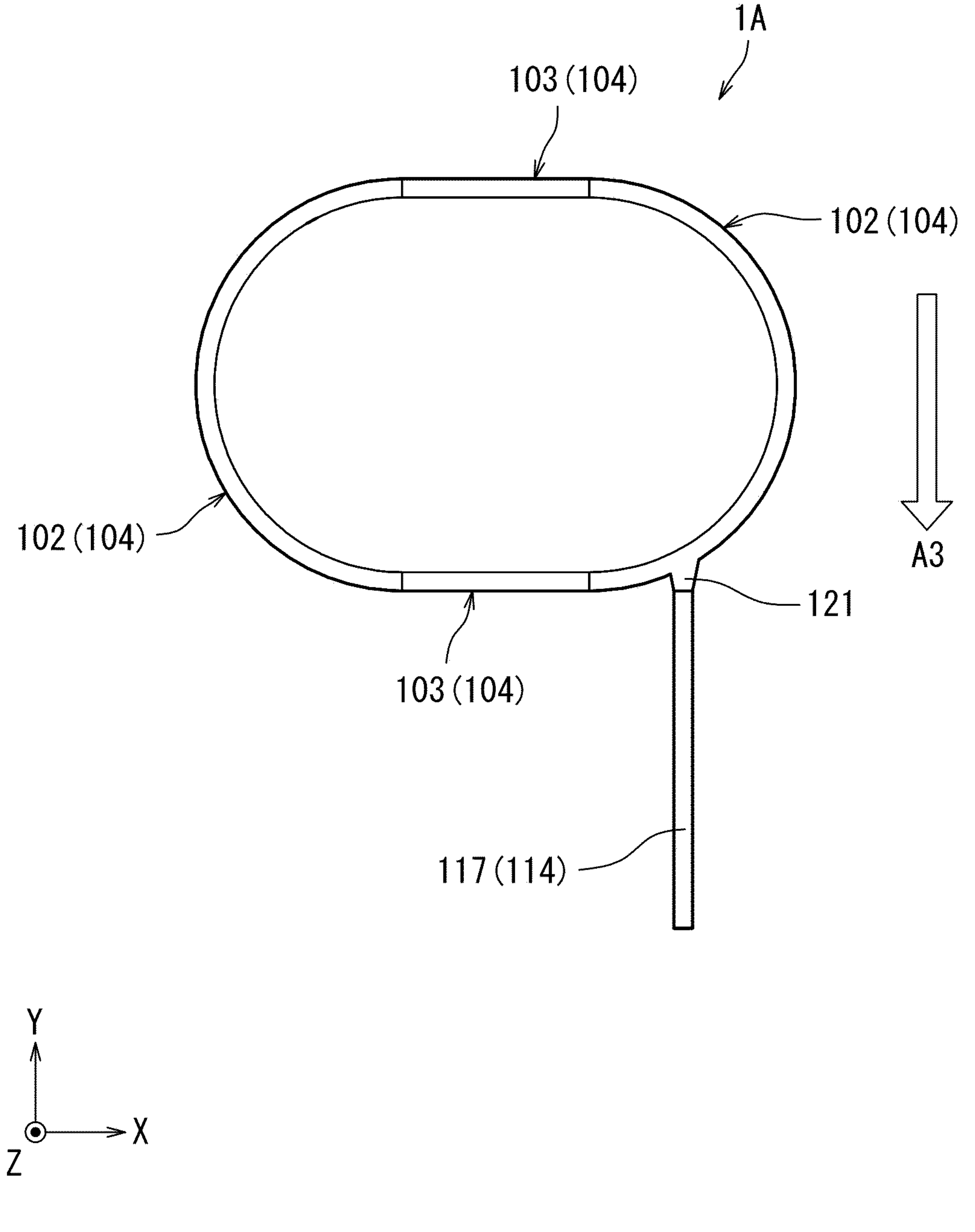
FIG. 11 is a front view of the film capacitor of FIG. 10.
Figure 12:
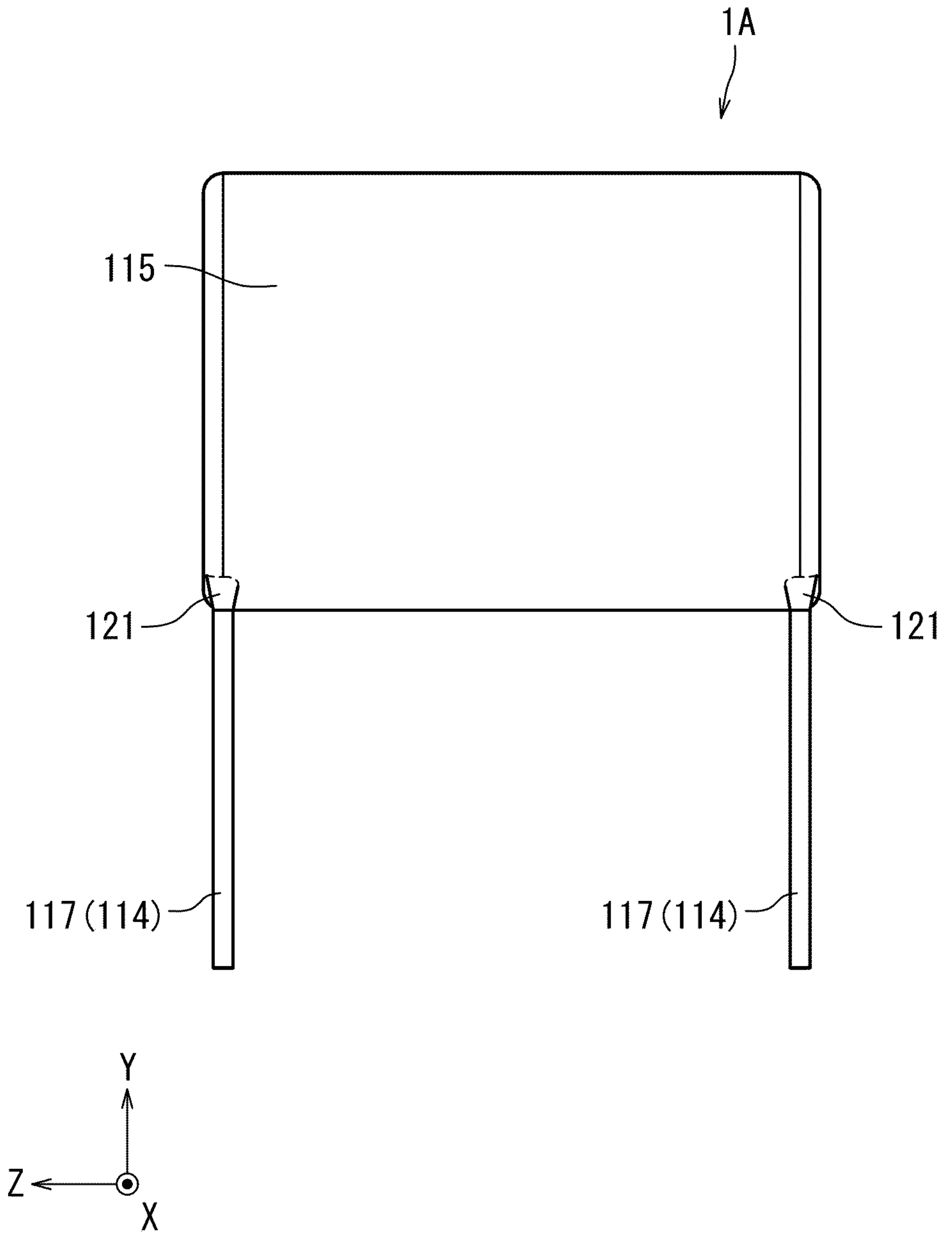
FIG. 12 is a side view of the film capacitor of FIG. 10.
Figure 13:
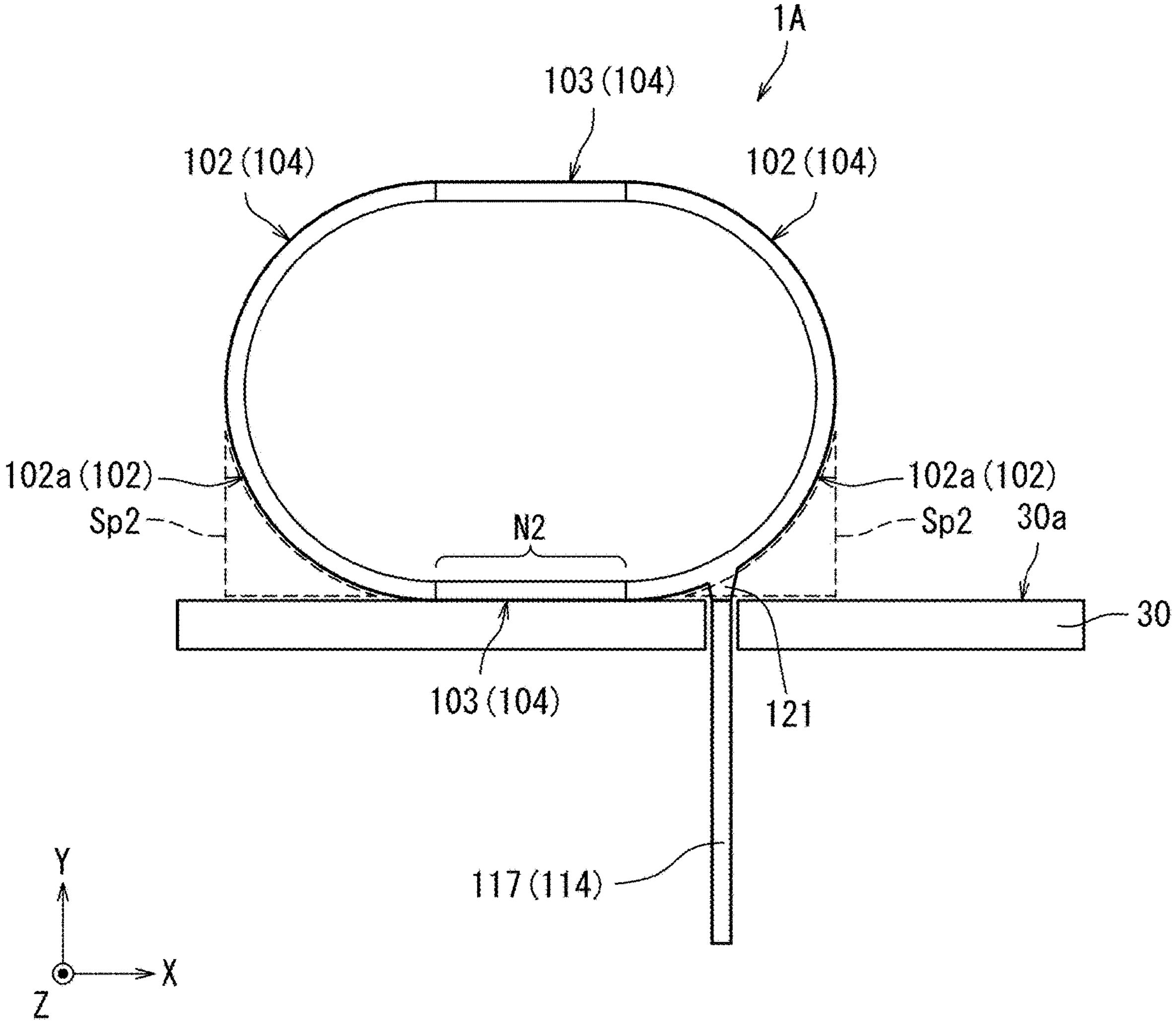
FIG. 13 is a diagram illustrating a state in which the film capacitor of FIG. 10 is mounted on a substrate.

FIG. 10 is a perspective view illustrating the film capacitor according to the second embodiment. FIG. 11 is a front view of the film capacitor of FIG. 10. FIG. 12 is a side view of the film capacitor of FIG. 10. FIG. 13 is a diagram illustrating a state in which the film capacitor of FIG. 10 is mounted on a substrate. Note that X, Y, and Z directions in the diagrams respectively indicate a lateral direction, a height direction, and a longitudinal direction of the film capacitor 1A.

In the second embodiment, as illustrated in FIGS. 10 to 12, an extending direction of an extension 117 is different from that of the first embodiment. In the film capacitor 1 of the first embodiment, the extension 17 of the terminal electrode 14 is formed to extend in a direction along the flat portion 3, but in the film capacitor 1A of the second embodiment, the extension 117 is arranged to extend in a direction (arrow A3 in FIG. 11) intersecting a flat portion 103. Since the extension 117 is arranged as described above, and the film capacitor 1A according to the second embodiment is mounted on a substrate in a manner that the flat portion 103 faces the main surface 30*a* of the substrate 30 as illustrated in FIG. 13.

As illustrated in FIG. 13, a position N2 closest to the substrate 30 is the flat portion 103 facing the main surface 30*a* of the substrate 30. Since the extension 117 is arranged at a position shifted from the position N2, when the film capacitor 1A is mounted on the substrate 30, a resin film 121 of an exterior material 115 is arranged so as to be accommodated in a space Sp2 between a region 102*a* facing the substrate 30 of a curved part 102 and the substrate 30.

Figure 14:
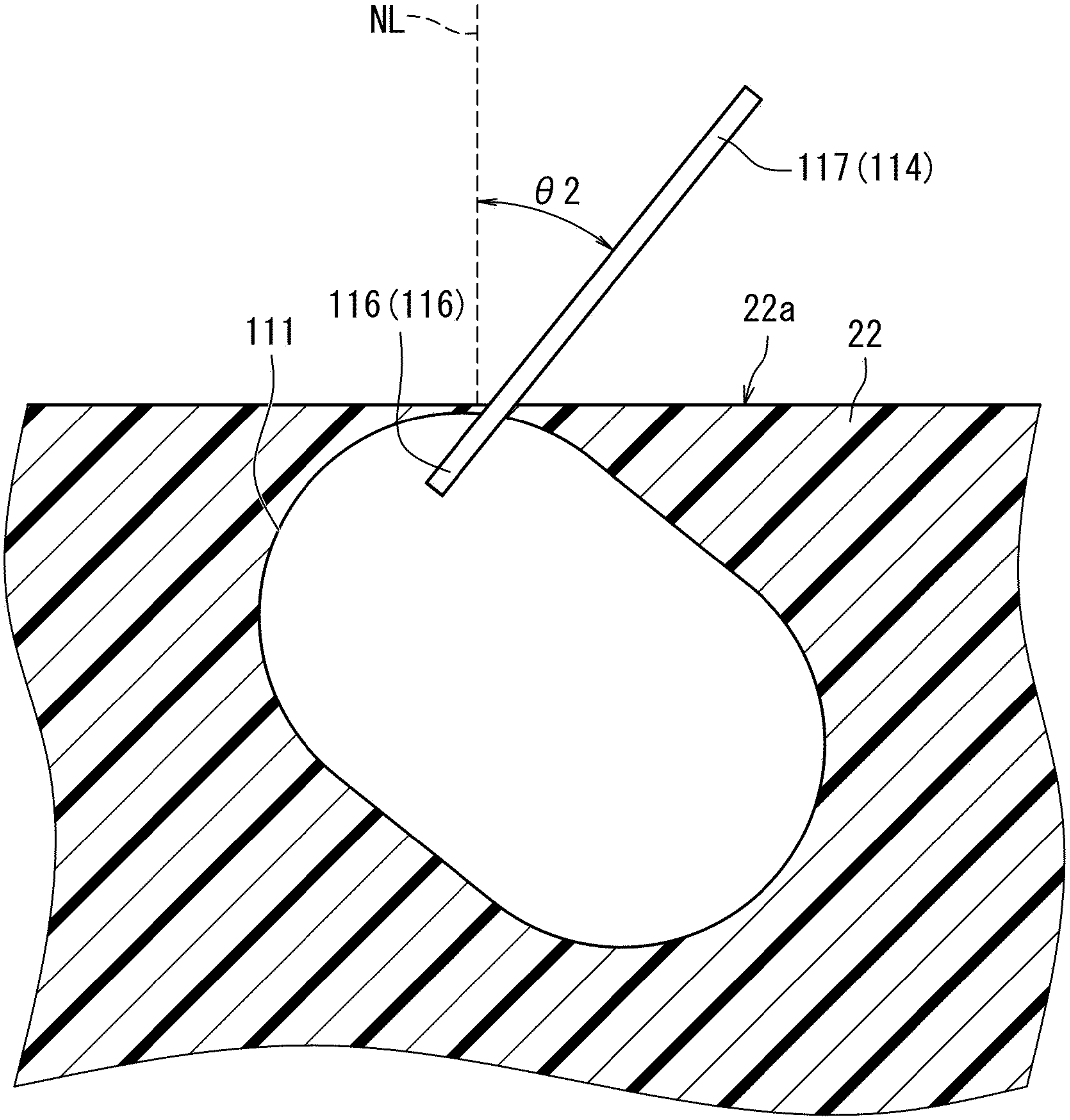
FIG. 14 is a diagram illustrating a state in which a laminate is immersed in liquid resin.

FIG. 14 is a diagram illustrating a state in which a laminate 111 in which a terminal electrode is connected to each of the first electrode and the second electrode is immersed in the liquid resin 22. As in the case of the first embodiment, the laminate 111 is immersed in the resin 22 in a manner that the extension 117 is inclined by an angle θ2 with respect to the normal line NL perpendicular to the liquid surface 22*a* of the liquid resin 22. When the exterior material 115 is formed in this manner, the resin film 121 can be formed to be accommodated in the space Sp2.

[Effect]

The film capacitor 1A according to the second embodiment can achieve an effect below.

Since the flat portion 103 is arranged to face the main surface 30*a* of the substrate 30, stability at the time of mounting can be improved. Further, height reduction can be further achieved.

Third Embodiment

A film capacitor 1B according to a third embodiment of the present disclosure will be described.

In the third embodiment, a point different from the first embodiment will be mainly described. In the third embodiment, the same or equivalent configuration as that of the first embodiment will be described with the same reference numeral. Further, in the third embodiment, description overlapping that of the first embodiment is omitted.

Figure 15:
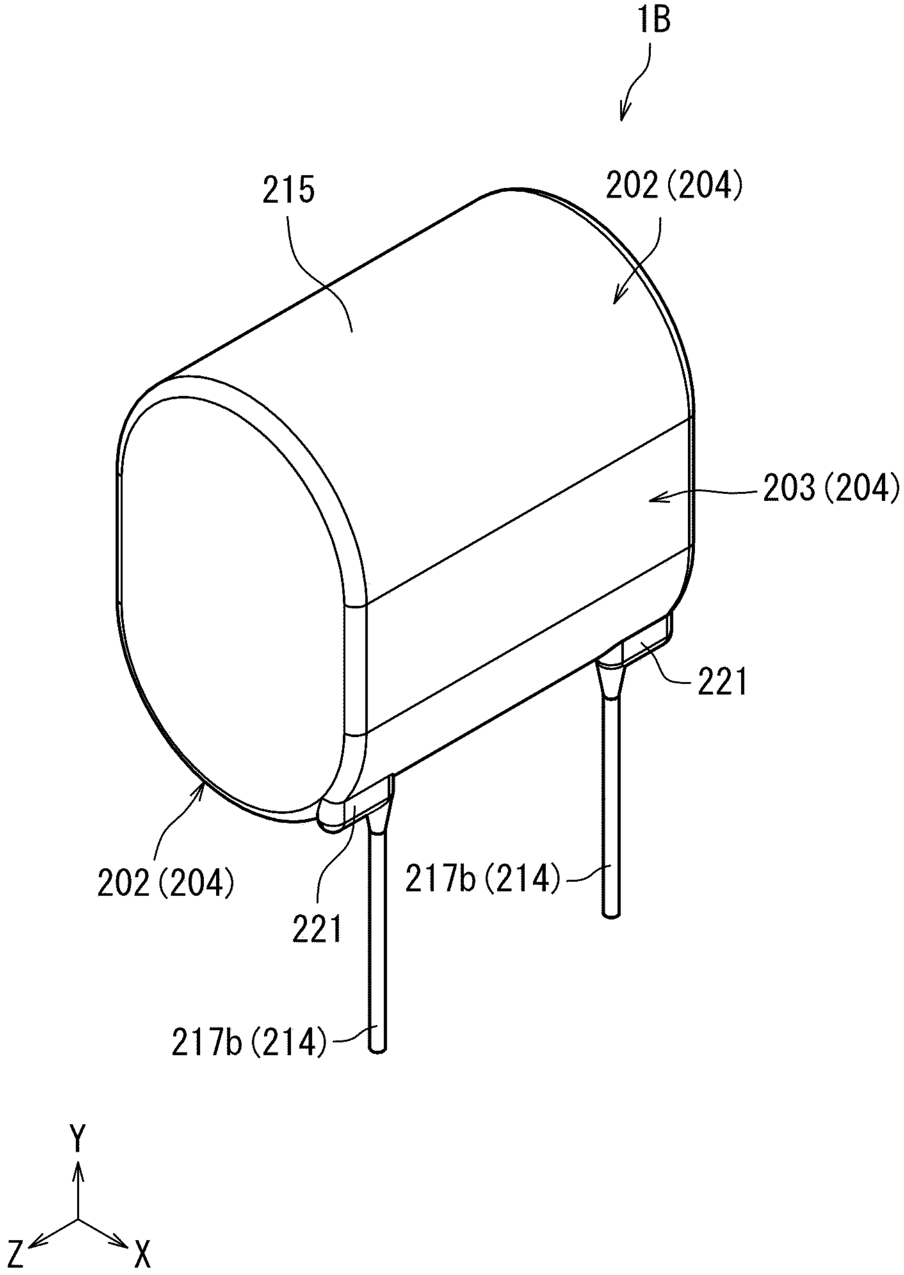
FIG. 15 is a perspective view illustrating the film capacitor according to a third embodiment.
Figure 16:
FIG. 16 is a front view of the film capacitor of FIG. 14.
Figure 17:
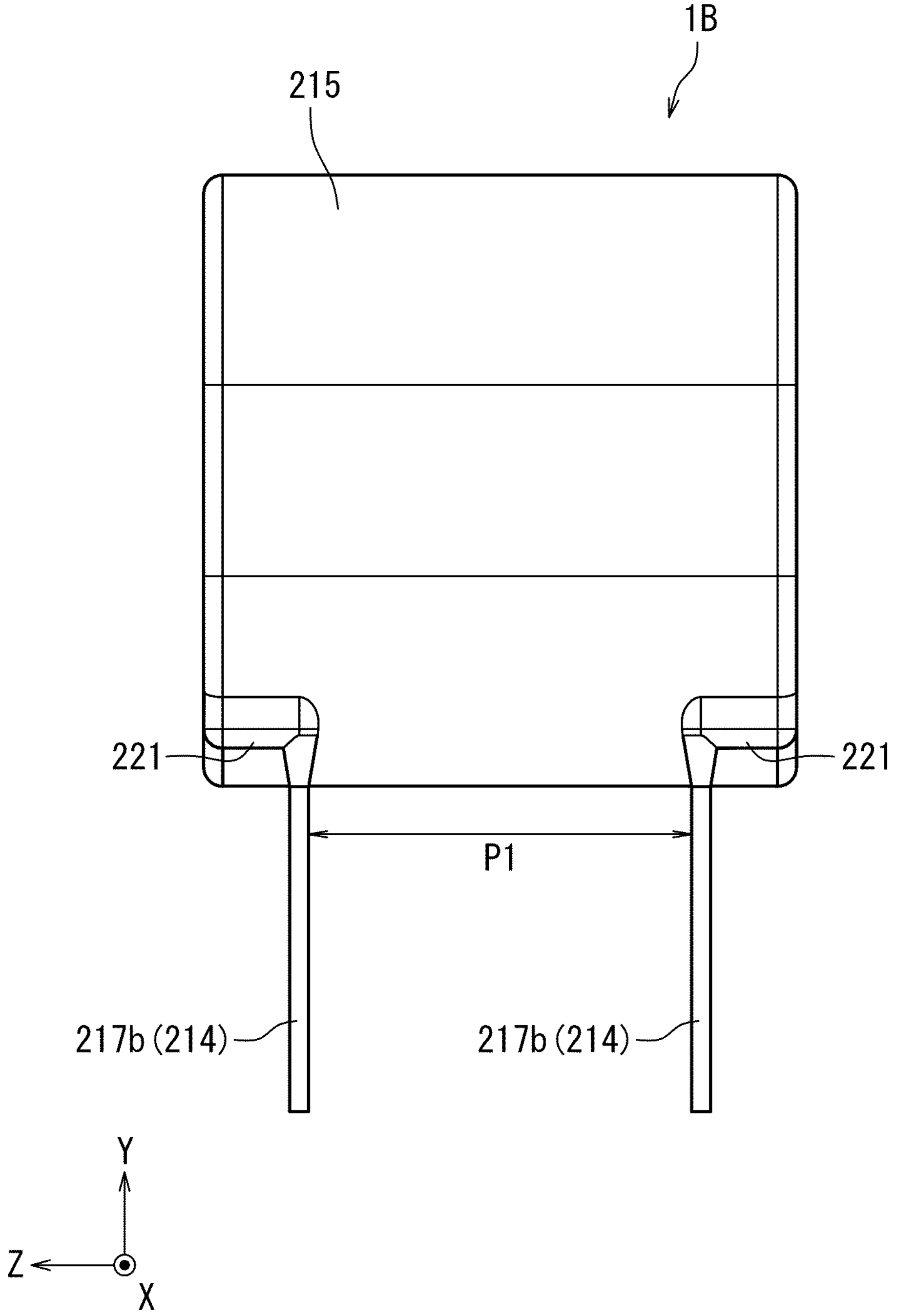
FIG. 17 is a side view of the film capacitor of FIG. 14.
Figure 18:
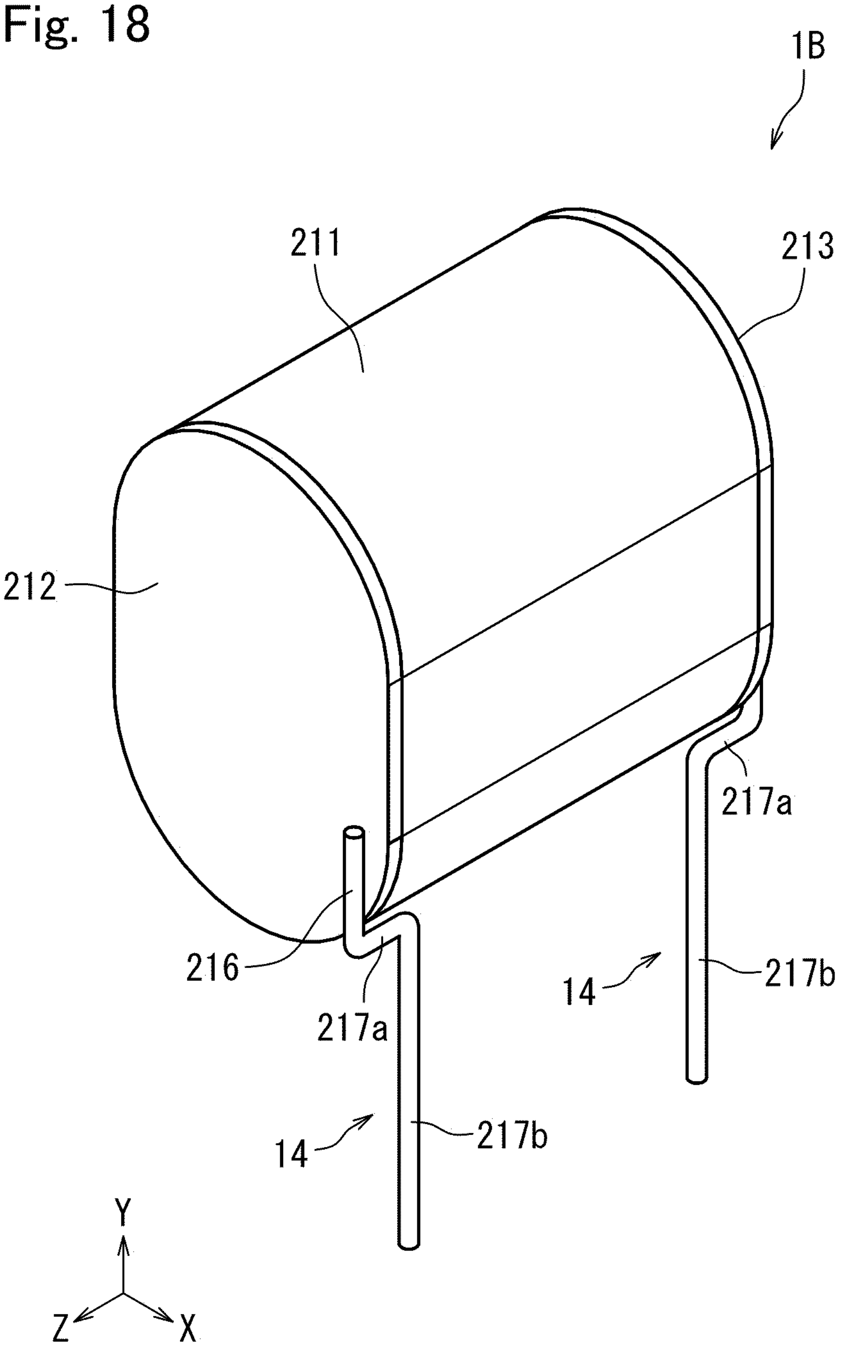
FIG. 18 is a diagram in which an exterior material of the film capacitor of FIG. 15 is omitted.
Figure 19:
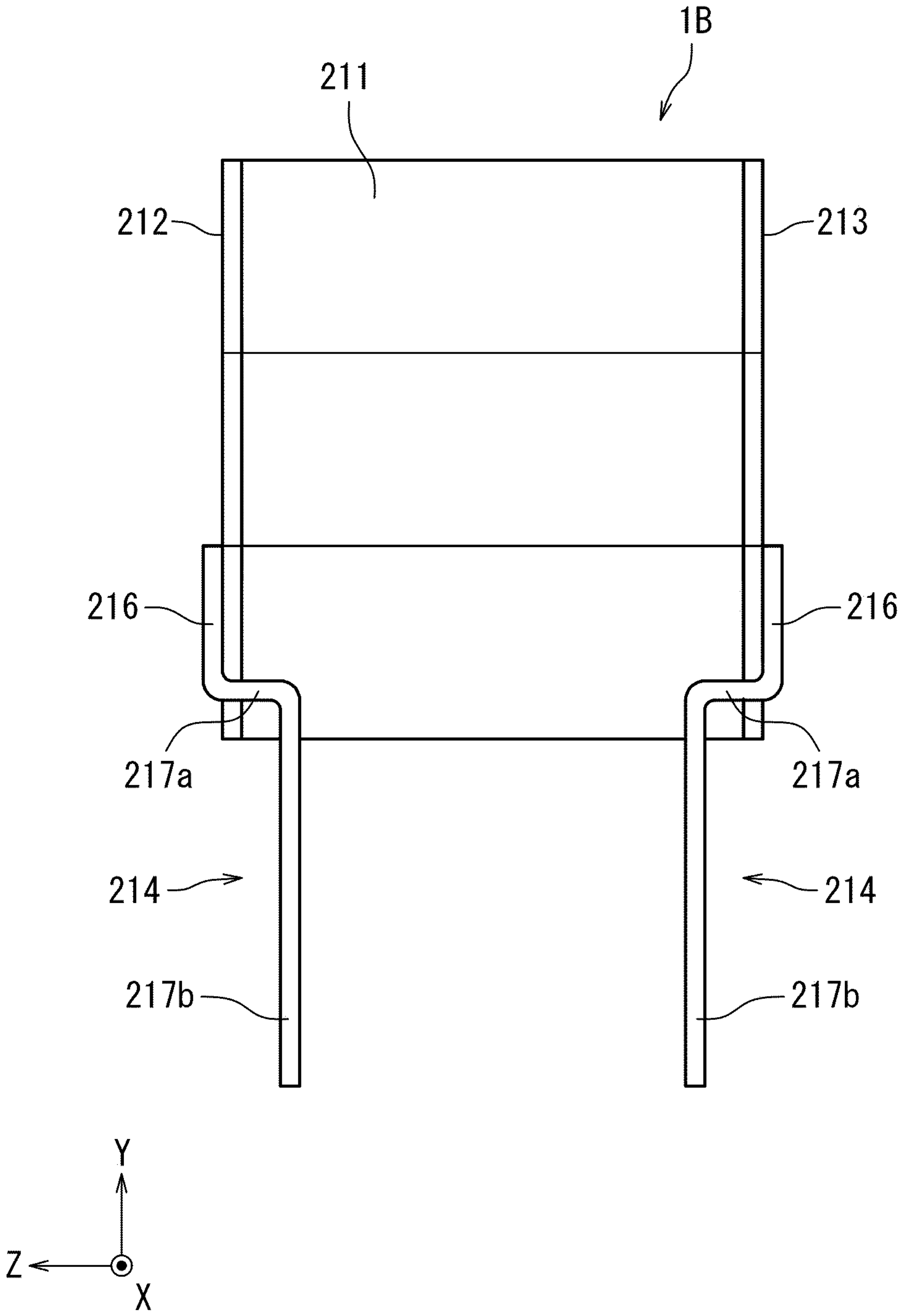
FIG. 19 is a diagram in which an exterior material of the film capacitor of FIG. 17 is omitted.

FIG. 15 is a perspective view illustrating the film capacitor 1B according to the third embodiment. FIG. 16 is a front view of the film capacitor 1B in FIG. 15. FIG. 17 is a side view of the film capacitor 1B in FIG. 15. FIG. 18 is a diagram in which an exterior material 215 of the film capacitor 1B in FIG. 15 is omitted. FIG. 19 is a diagram in which the exterior material 215 of the film capacitor 1B in FIG. 17 is omitted.

In the third embodiment, as illustrated in FIGS. 15 to 19, a shape of a terminal electrode 214 is different from that of the first embodiment. Specifically, an extension of the terminal electrode 214 includes a first extension 217*a* extending along a curved part 202 of the film capacitor 1B from a connector 216, and a second extension 217*b* extending from the first extension 217*a* toward a substrate (not illustrated).

In the terminal electrode 214, the connector 216, the first extension 217*a*, and the second extension 217*b* can be formed by bending a lead wire or the like, for example. The connector 216 of the terminal electrode 214 in which the connector 216, the first extension 217*a*, and the second extension 217*b* are formed in advance can be attached by welding to a first electrode 212 and a second electrode 213 at both ends of a laminate 211.

By arranging the first extension 217*a* along a side surface 204 of the film capacitor 1B, an interval between two of the terminal electrodes 214 connected to the first electrode 212 and the second electrode 213 can be changed. Further, since the first extension 217*a* extends along the curved part 202 from the connector 216, when the film capacitor 1B is mounted on a substrate, a resin film 221 formed on the first extension 217*a* is arranged in a space formed between the substrate and the curved part 202. For this reason, it is possible to change an interval between the terminal electrodes 214 while accommodating the resin film 221 in a dead space, and it is possible to improve degree of freedom in design.

Figure 20:
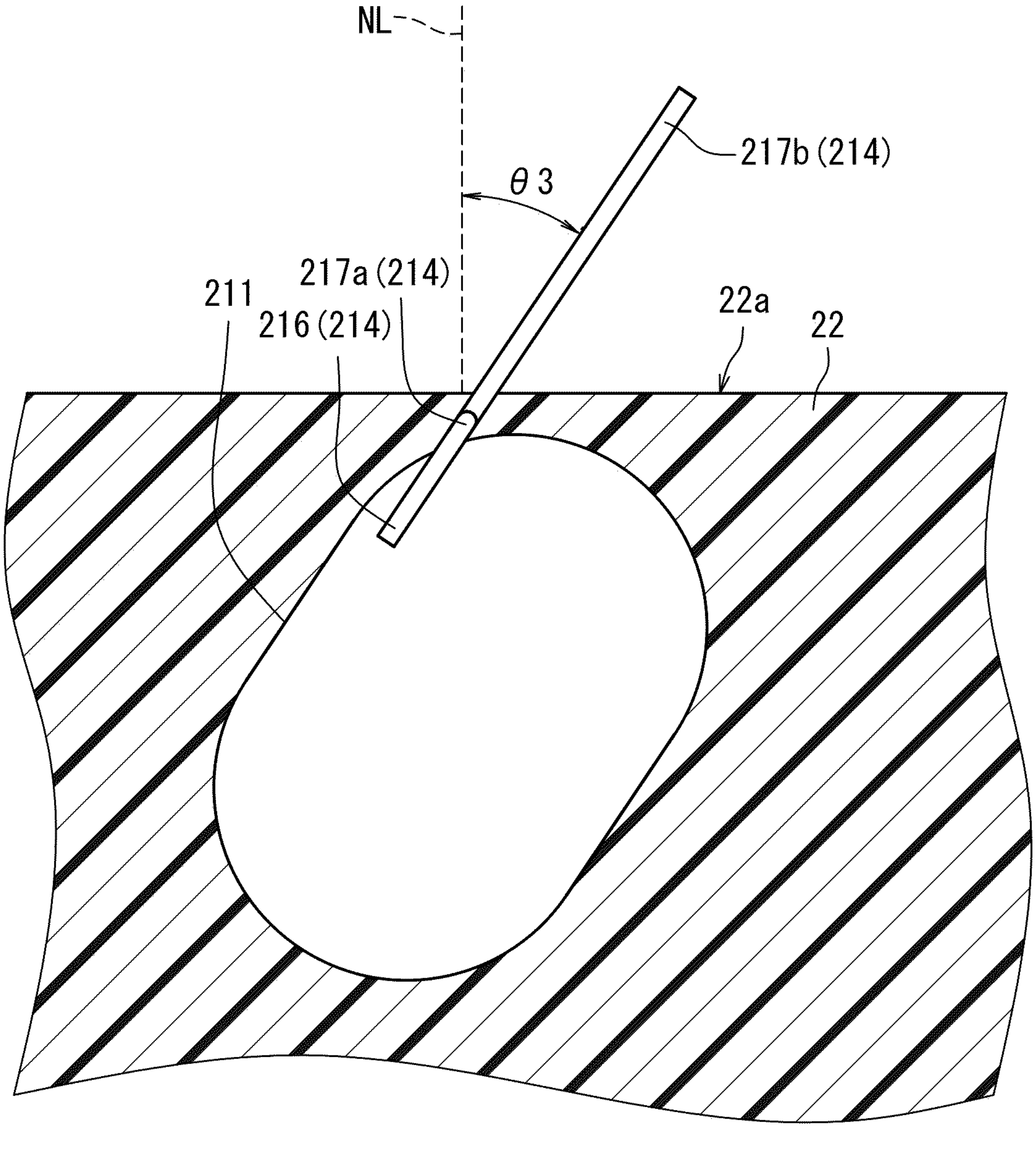
FIG. 20 is a diagram illustrating a state in which the laminate is immersed in liquid resin.

FIG. 20 is a diagram illustrating a state in which the laminate 211 in which a terminal electrode is connected to each of the first electrode and the second electrode is immersed in the liquid resin 22. As in the case of the first embodiment, the laminate 211 is immersed in the resin 22 in a manner that the extension 217 is inclined by an angle θ3 with respect to the normal line NL perpendicular to the liquid surface 22*a* of the liquid resin 22. At this time, the first extension 217*a* is preferably immersed in the resin 22. When the exterior material 215 is formed in this manner, the resin film 221 can be formed to be accommodated in a dead space.

[Effect]

The film capacitor 1B according to the third embodiment can achieve an effect below.

In the film capacitor 1B, an extension includes the first extension 217*a* extending along the curved part 202 from the connector 216, and the second extension 217*b* extending from the first extension 217*a* toward a substrate.

With such a configuration, since an interval between the terminal electrodes 214 can be changed without increasing a mounting area, degree of freedom in design can be improved.

Fourth Embodiment

A film capacitor 1C according to a fourth embodiment of the present disclosure will be described.

In the fourth embodiment, a point different from the first embodiment will be mainly described. In the fourth embodiment, the same or equivalent configuration as that of the first embodiment will be described with the same reference numeral. Further, in the fourth embodiment, description overlapping that of the first embodiment is omitted.

Figure 21:
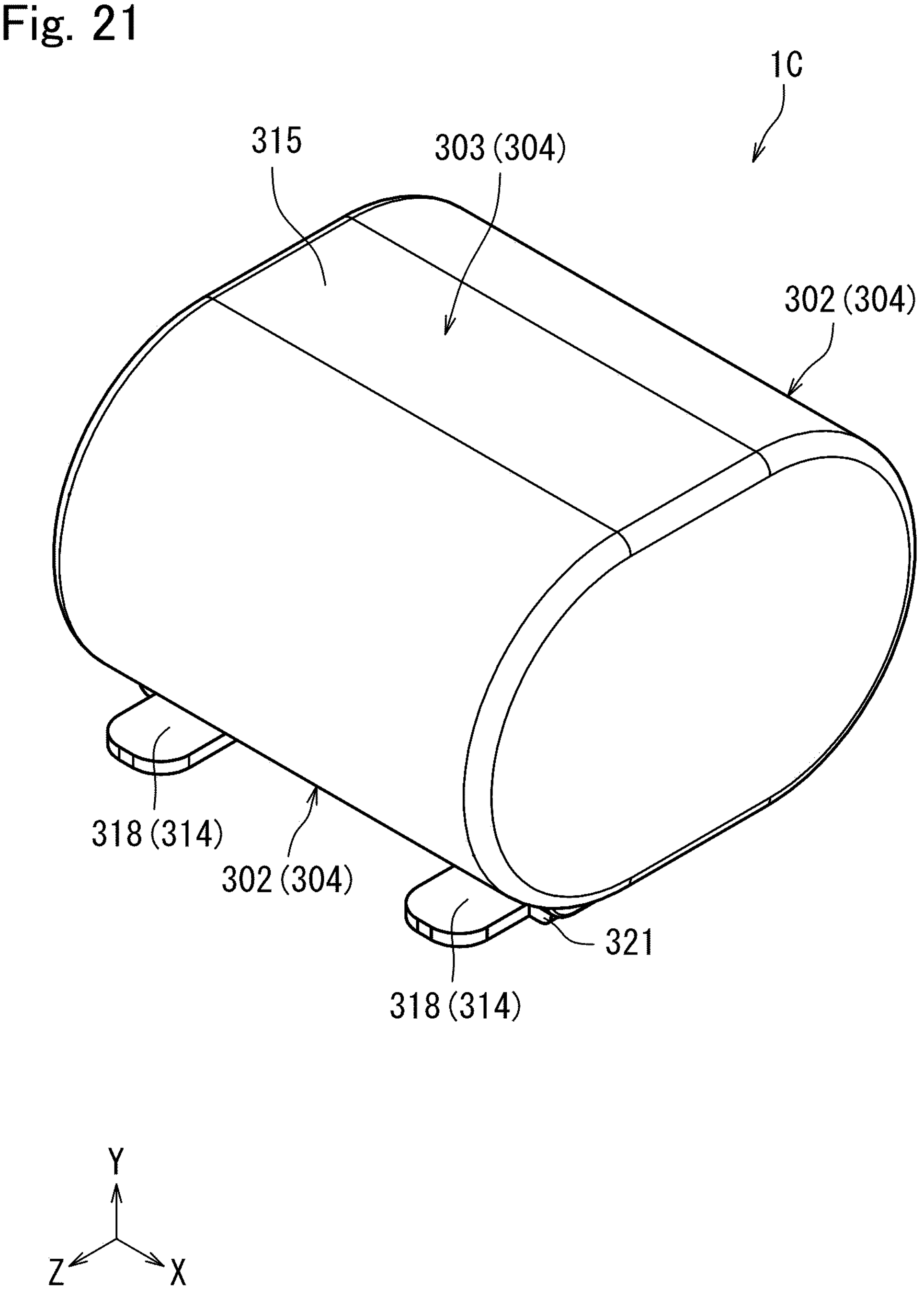
FIG. 21 is a perspective view illustrating the film capacitor according to a fourth embodiment.
Figure 22:
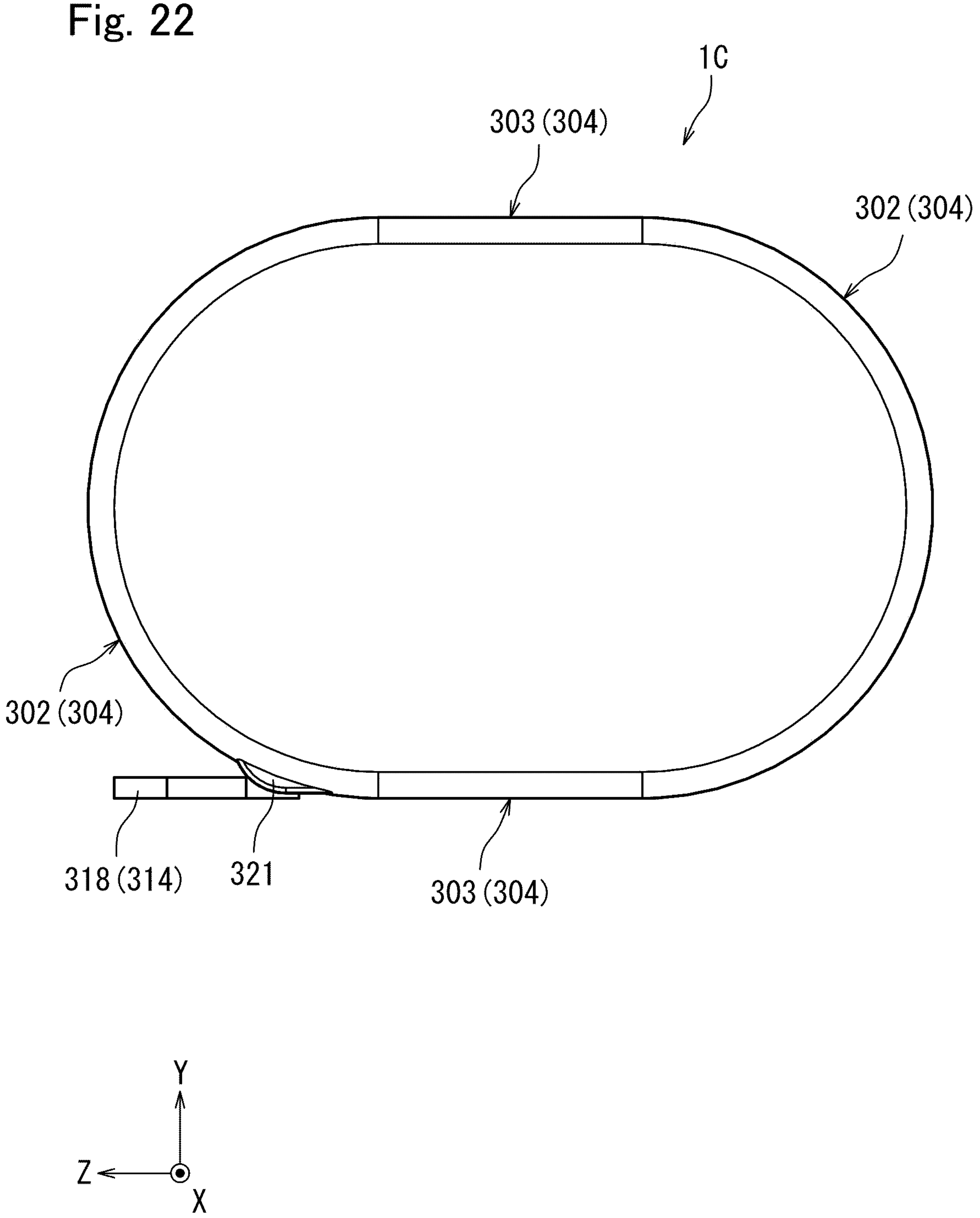
FIG. 22 is a front view of the film capacitor of FIG. 21.
Figure 23:
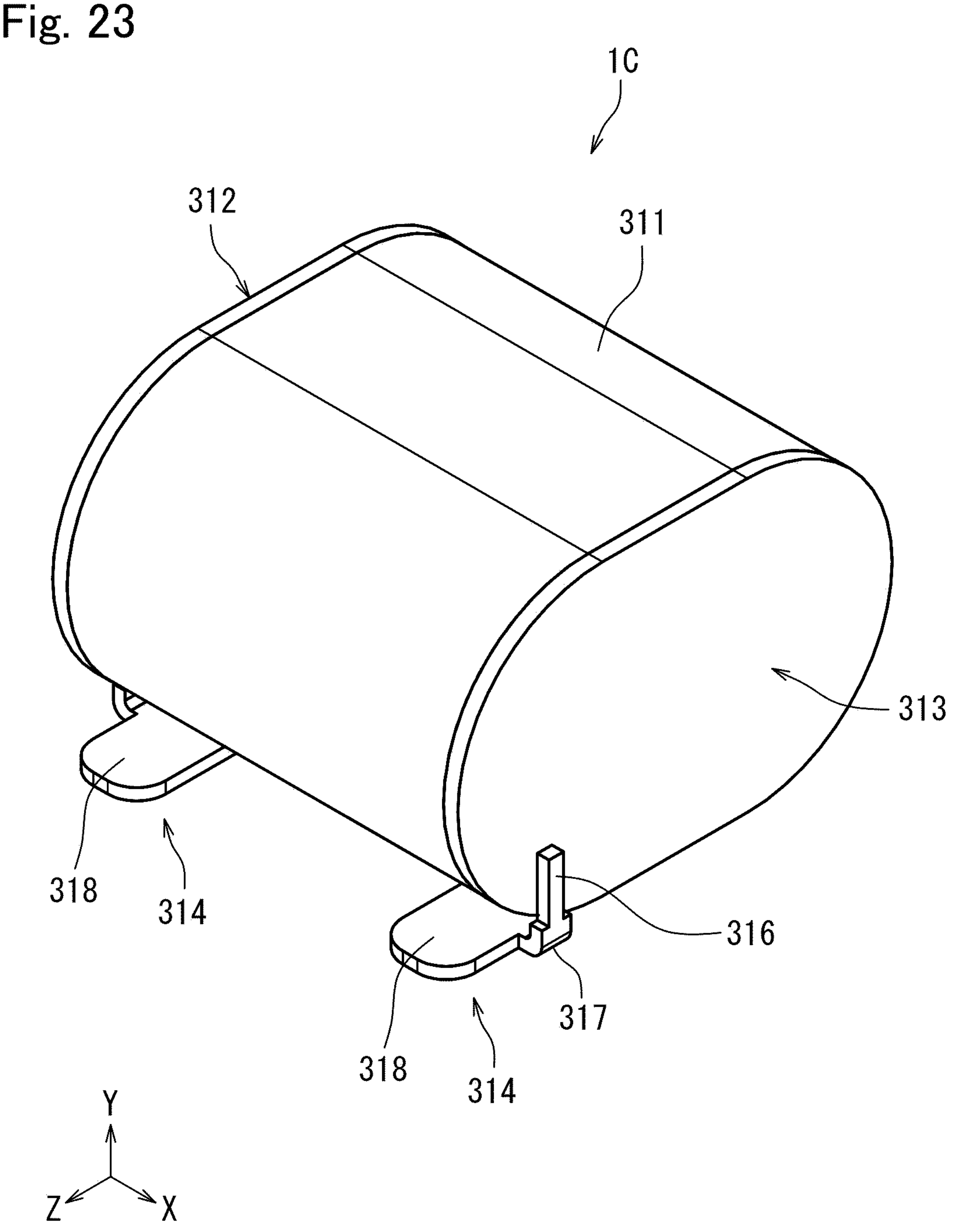
FIG. 23 is a diagram in which an exterior material of the film capacitor of FIG. 21 is omitted.
Figure 24:
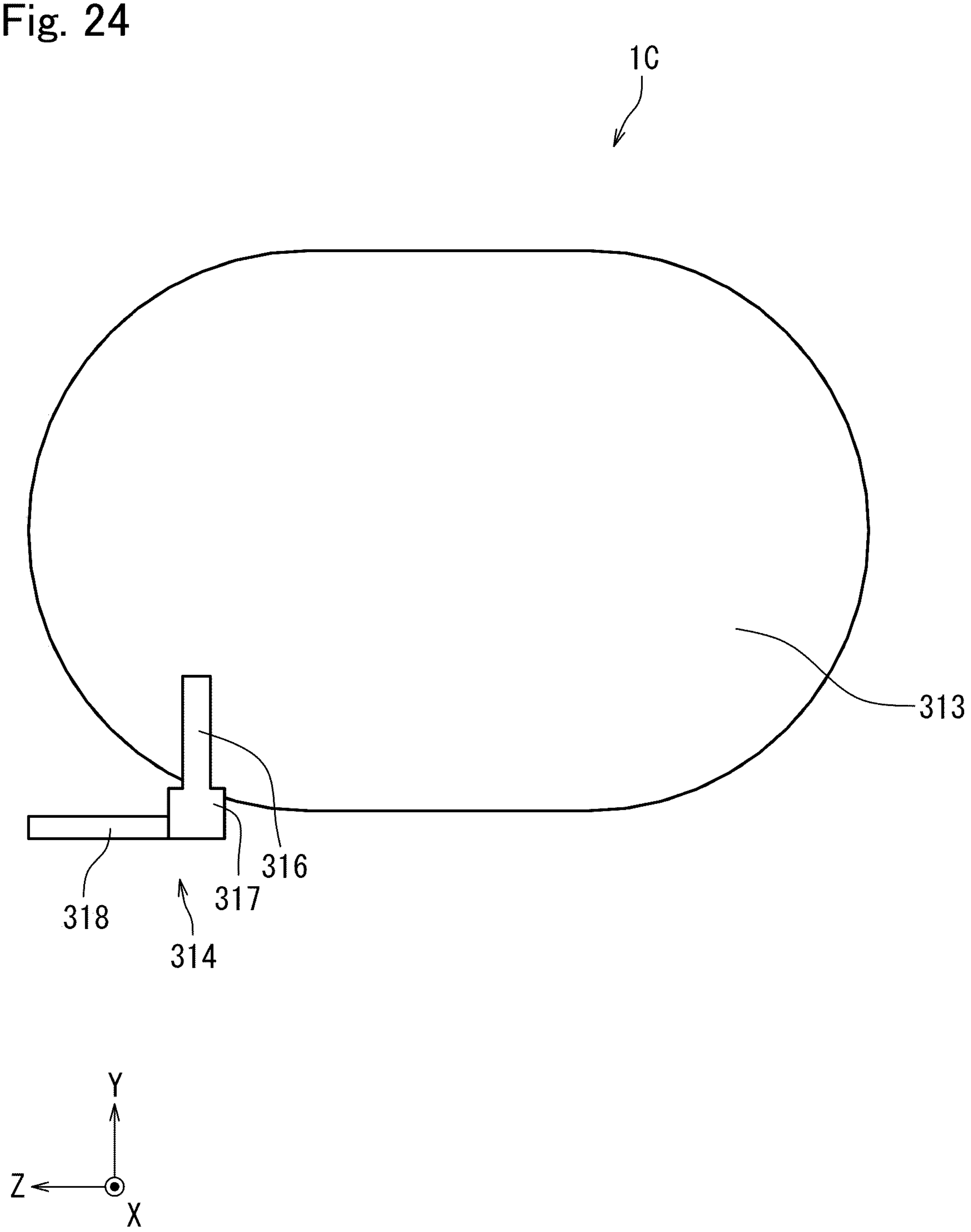
FIG. 24 is a diagram in which an exterior material of the film capacitor of FIG. 22 is omitted.
Figure 25:
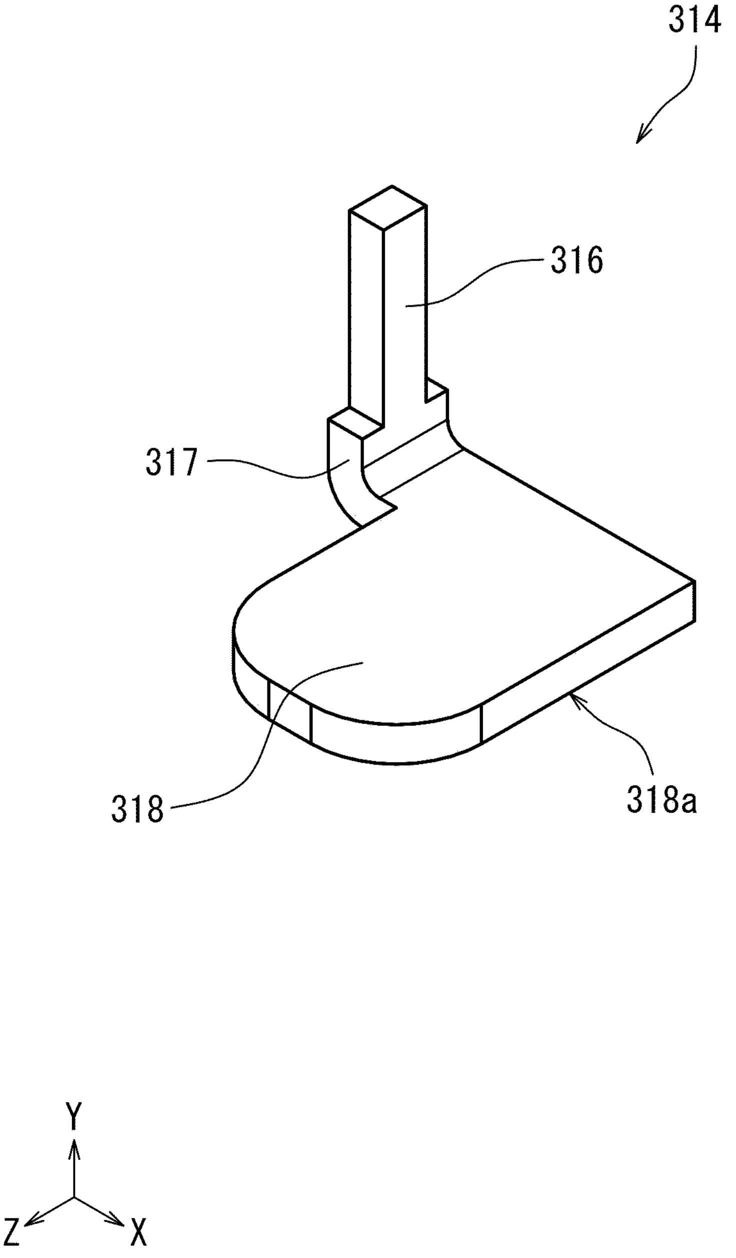
FIG. 25 is a perspective view illustrating a terminal electrode of the film capacitor of FIG. 21.

FIG. 21 is a perspective view illustrating the film capacitor 1C according to the fourth embodiment. FIG. 22 is a front view of the film capacitor 1C in FIG. 21. FIG. 23 is a diagram in which an exterior material 315 of the film capacitor 1C in FIG. 21 is omitted. FIG. 24 is a diagram in which the exterior material 315 of the film capacitor in FIG. 22 is omitted. FIG. 25 is a perspective view illustrating a terminal electrode 314 of the film capacitor in FIG. 21.

The fourth embodiment is different from the first embodiment in that the terminal electrode 314 includes a substrate connector 318. Specifically, as illustrated in FIGS. 21 to 24, the terminal electrode 314 further has the substrate connector 318 extending in a direction along a substrate 31 (see FIG. 27) from an extension 317. Further, a resin film 321 is formed on at least a part of the extension 317.

In the present embodiment, as illustrated in FIG. 25, the terminal electrode 314 is formed into a shape having a connector 316, the extension 317, and the substrate connector 318. The substrate connector 318 is formed in a plate shape. The terminal electrode 314 can be formed, for example, by bending a metal plate cut into a predetermined shape by press working.

Figure 26:
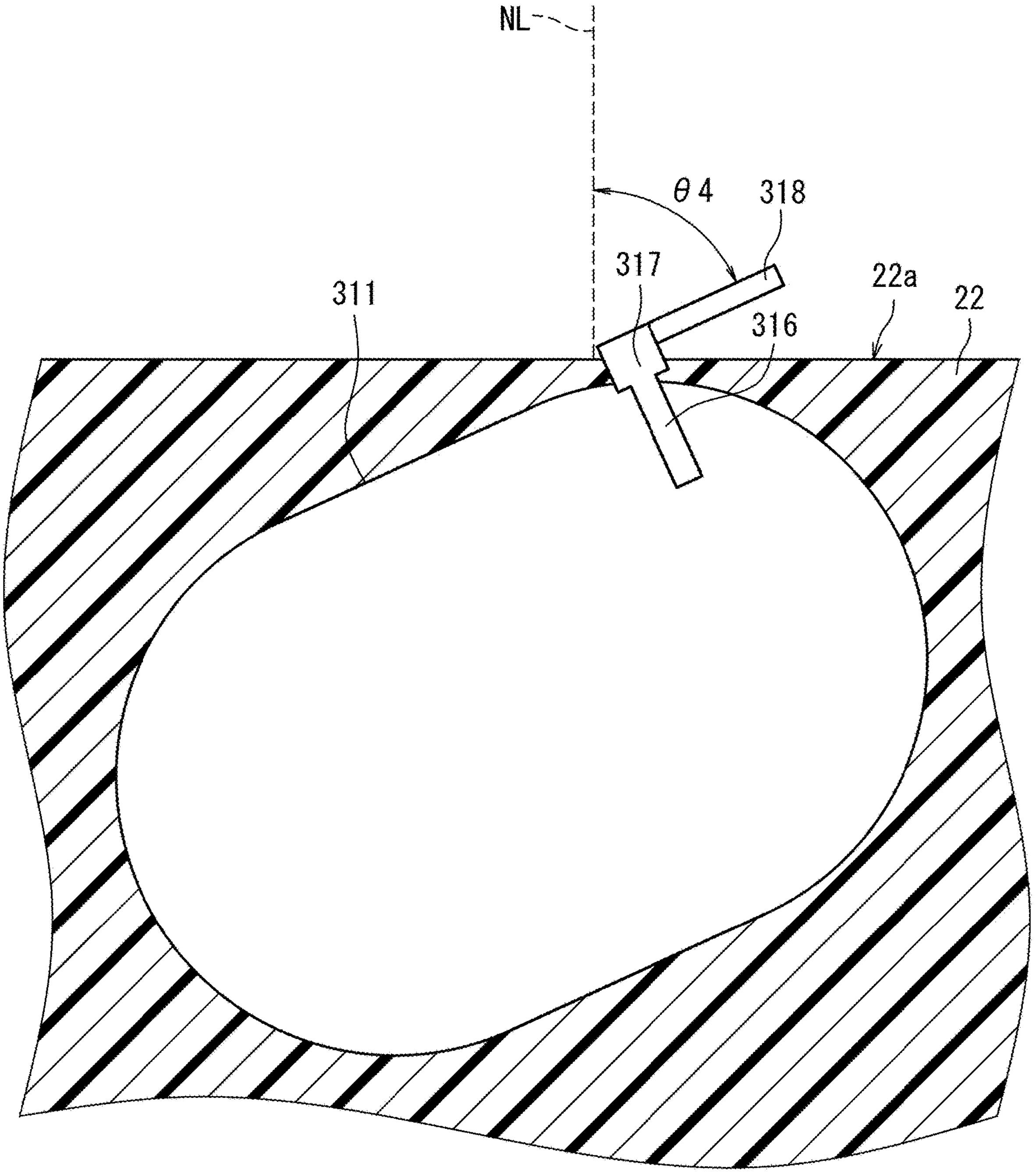
FIG. 26 is a diagram illustrating a state in which a laminate is immersed in liquid resin.

FIG. 26 is a diagram illustrating a state in which a laminate 311 in which the terminal electrode 314 is connected to each of a first electrode 312 and a second electrode 313 is immersed in the liquid resin 22. In the fourth embodiment, the substrate connector 318 is immersed in the resin 22 so as to be inclined by an angle θ4 with respect to the normal line NL perpendicular to the liquid surface 22*a* of the liquid resin 22. The angle θ4 can be appropriately adjusted depending on a shape or size of the film capacitor. When the exterior material 315 is formed in this manner, it is possible to prevent generation of the resin film 321 on a main surface 318*a* (see FIG. 25) of the substrate connector 318 connected to the substrate 31. By forming the resin 22 in this manner, at least a part of the extension 317 and the connector 316 of the terminal electrode 314 are covered with the resin.

Figure 27:
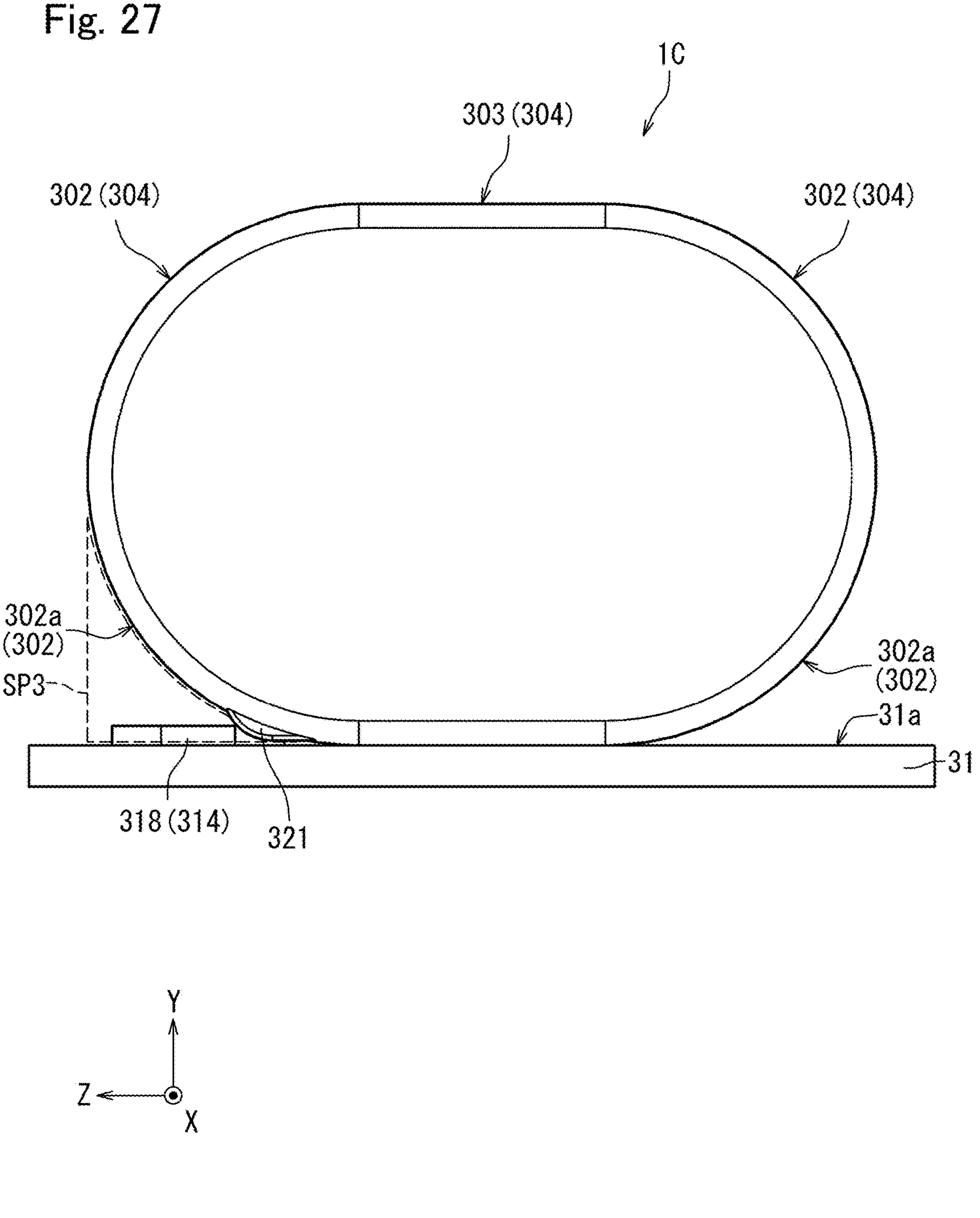
FIG. 27 is a diagram illustrating a state in which the film capacitor of FIG. 21 is mounted on a substrate.

FIG. 27 is a diagram illustrating a state in which the film capacitor 1C of FIG. 21 is mounted on the substrate 31. As illustrated in FIG. 27, the film capacitor 1C is mounted on the substrate 31 by surface mounting. At this time, the terminal electrode 314 is arranged so as to be accommodated in a space Sp3 provided between a region 302*a* facing the substrate 31 of a curved part 302 and a main surface 31*a* of the substrate 31. For this reason, it is possible to provide the film capacitor 1C suitable for surface mounting without increasing a mounting area.

[Effect]

The film capacitor 1C according to the fourth embodiment can achieve an effect below.

In the film capacitor 1C, the terminal electrode 314 further includes the substrate connector 318 extending in a direction along the substrate 31 from the extension 317. The substrate connector 318 is arranged in the space Sp3.

With such a configuration, it is possible to provide the film capacitor 1C suitable for surface mounting while reducing a mounting area.

The present disclosure is useful for a capacitor used in various electronic devices, electric devices, industrial devices, vehicle devices, and the like.

EXPLANATION OF REFERENCES

1, 1A to 1C film capacitor
2, 102, 202, 302 curved part
3, 103 flat portion
4, 204 side surface
11, 111, 211, 311 laminate
12, 212, 312 first electrode (external electrode)
13, 213, 313 second electrode (external electrode)
14, 214, 314 terminal electrode
15, 115, 215, 315 exterior material
16, 216, 316 connector
17, 117, 317 extension
30, 31 substrate
217*a* first extension
217*b* second extension
318 substrate connector

The invention claimed is:

1. A film capacitor comprising:
a laminate of a dielectric film;
a first electrode on a first end surface of the laminate;
a second electrode on a second end surface of the laminate;
a terminal electrode including a connector electrically connected to the first electrode or the second electrode, and an extension extending in a substrate mounting direction along the first electrode or the second electrode from the connector; and
an exterior material covering the laminate, the first electrode, the second electrode, the connector, and at least a part of the extension, wherein
the film capacitor has a columnar shape having a side surface connecting the first electrode and the second electrode,
the side surface has a curved part,
at least the part of the extension is arranged at a first position shifted from a second position closest to a substrate in the curved part in a space between a region facing the substrate of the curved part and the substrate when the film capacitor is mounted on the substrate,
the terminal electrode further includes a substrate connector extending in a direction along the substrate from the extension when the film capacitor is mounted on the substrate, and the substrate connector is arranged in the space.

2. The film capacitor according to claim 1, wherein a portion of the exterior material covering at least the part of the extension is arranged in the space.

3. The film capacitor according to claim 2, wherein the portion of the exterior material covering the at least the part of the extension is arranged at a third position farther from the substrate than the second position closest to the substrate in the curved part.

4. The film capacitor according to claim 3, wherein the extension includes a first extension extending along the curved part from the connector and a second extension extending toward the substrate from the first extension when the film capacitor is mounted on the substrate.

5. The film capacitor according to claim 1, wherein a part of the side surface of the film capacitor is in contact with the substrate when the film capacitor is mounted on the substrate.

6. The film capacitor according to claim 1, wherein a diameter of the curved part is 8 mm or more.

7. The film capacitor according to claim 1, wherein a portion of the exterior material covering at least the part of the extension is arranged at a third position farther from the substrate than the second position closest to the substrate in the curved part.

8. The film capacitor according to claim 1, wherein the extension includes a first extension extending along the curved part from the connector and a second extension extending toward the substrate from the first extension when the film capacitor is mounted on the substrate.

9. The film capacitor according to claim 1, wherein the curved part of the side surface faces a main surface of the substrate when the film capacitor is mounted on the substrate.

10. The film capacitor according to claim 1, wherein the side surface has a flat portion connected to the curved part, and a distance from the extension of the terminal electrode to the flat portion is ¼ or less of a diameter of the curved part.

11. The film capacitor according to claim 1, wherein the side surface has a flat portion connected to the curved part, and the extension of the terminal electrode extends in a direction along the flat portion.

12. The film capacitor according to claim 1, wherein the side surface has a flat portion connected to the curved part, and the extension of the terminal electrode extends in a direction intersecting the flat portion.

13. The film capacitor according to claim 1, wherein the side surface has a flat portion connected to the curved part, and the flat portion faces a main surface of the substrate when the film capacitor is mounted on the substrate.

14. A method for producing a film capacitor, the method comprising:

forming a laminate of a dielectric film;

forming a first electrode at a first end of the laminate;

forming a second electrode at a second end of the laminate;

connecting a terminal electrode having a connector with at least one of the first electrode or the second electrode, and having an extension extending from the connector in a substrate mounting direction along the first electrode or the second electrode from the connector;

immersing the laminate to which the terminal electrode is connected in a liquid exterior material by inclining the extension of the terminal electrode from a direction perpendicular to a liquid surface of the exterior material; and curing the exterior material, wherein the exterior material covers the laminate, the first electrode, the second electrode, the connector, and at least a part of the extension, the film capacitor has a columnar shape having a side surface connecting the first electrode and the second electrode, the side surface has a curved part, at least the part of the extension is arranged at a first position shifted from a second position closest to a substrate in the curved part in a space between a region facing the substrate of the curved part and the substrate when the film capacitor is mounted on the substrate, the terminal electrode further includes a substrate connector extending in a direction along the substrate from the extension when the film capacitor is mounted on the substrate, and the substrate connector is arranged in the space.

* * * * *